United States Patent [19]

Arend

[11] Patent Number: 5,417,913
[45] Date of Patent: May 23, 1995

[54] INJECTION MOLDING SYSTEM WITH REMOVABLE TIE RODS

[76] Inventor: Donald P. Arend, 7747 Aspenwood Dr. SE., Ada, Mich. 49301

[21] Appl. No.: 158,876

[22] Filed: Nov. 29, 1993

[51] Int. Cl.[6] .................. B29C 45/40; B29C 45/64
[52] U.S. Cl. ............................... 264/328.1; 264/334; 425/589; 425/592; 425/595; 425/451.5; 425/451.9
[58] Field of Search ............. 264/328.1, 328.7, 328.11, 264/334; 425/88, 185, 188, 190, 192 R, 193, 195, 575, 589, 590, 592, 595, 450.1, 451.2, 451.5, 451.9, 556, 436 R, 441, 442

[56] References Cited

U.S. PATENT DOCUMENTS

| | | | |
|---|---|---|---|
| 3,465,387 | 9/1969 | Allard et al. | 425/149 |
| 3,590,418 | 7/1971 | Hoeschel | 425/590 |
| 3,729,283 | 4/1973 | Eggenberger et al. | 425/595 |
| 3,951,579 | 4/1976 | Myers et al. | 425/590 |
| 4,172,872 | 10/1979 | Nagai | 264/519 |
| 4,248,583 | 2/1981 | Hedke et al. | 425/451.9 |
| 4,708,625 | 11/1987 | Arend | 425/589 |
| 4,948,358 | 8/1990 | Kushibe et al. | 425/574 |
| 4,984,980 | 1/1991 | Ueno | 425/595 |
| 5,033,955 | 7/1991 | Faig et al. | 425/589 |
| 5,066,217 | 11/1991 | Fukuzawa et al. | 425/589 |
| 5,238,394 | 8/1993 | Hirata | 425/451.9 |
| 5,249,951 | 10/1993 | Leonhartsberger et al. | 425/451.9 |

*Primary Examiner*—Jill L. Heitbrink
*Attorney, Agent, or Firm*—Beaman & Beaman

[57] ABSTRACT

The method and apparatus for producing large injection molded products and producing high tonnage injection molding apparatus utilizing tie rods interposed between the mold part supporting platens, the tie rods being removed from proximity to the mold parts upon the mold parts being opened to facilitate removal of large parts from the mold, and to facilitate mold part setup and installation. The tie rods are axially displaceable with respect to both mold part supporting platens and selectively locked and released from the platens during each molding cycle.

3 Claims, 22 Drawing Sheets

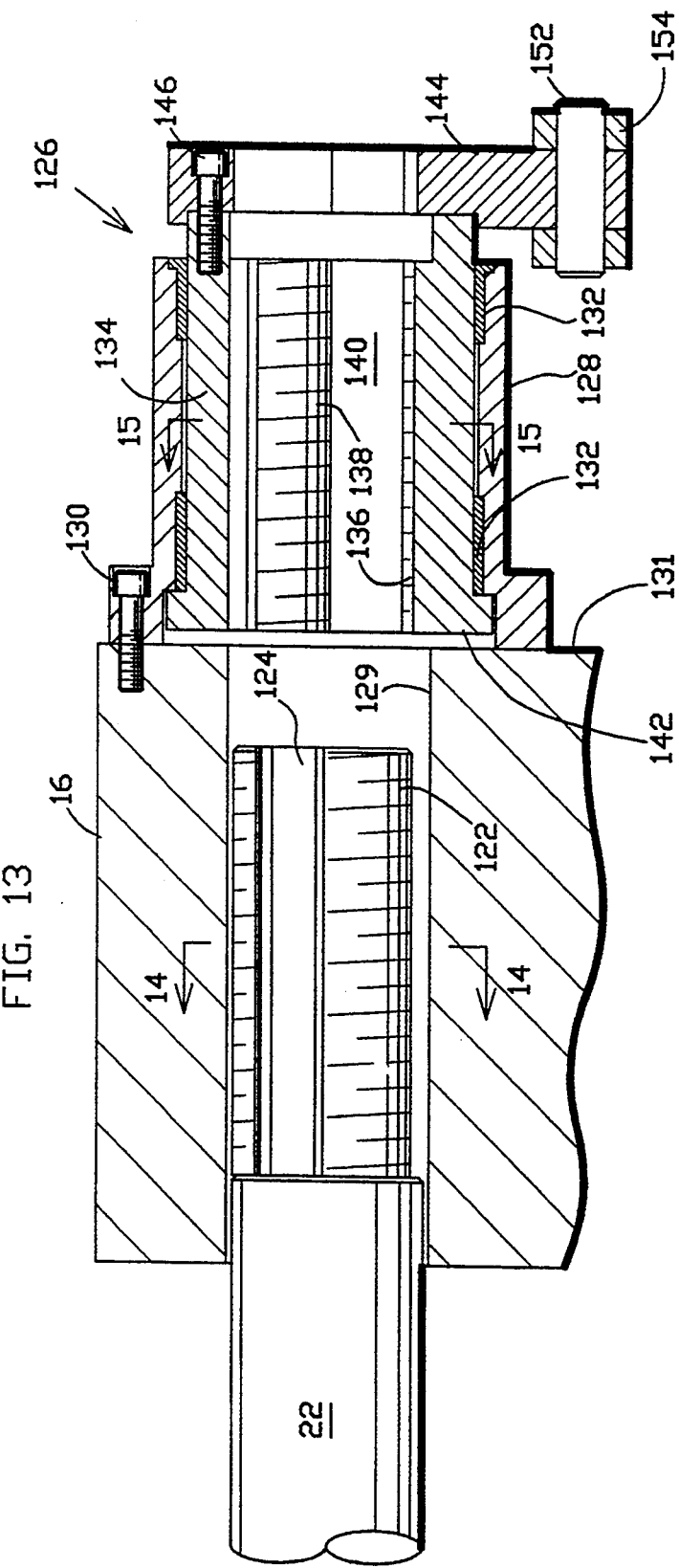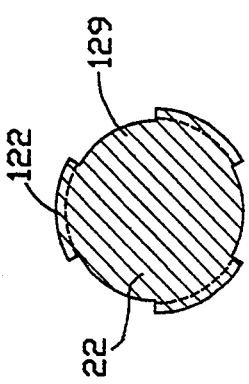

INJECTION MOLDING SYSTEM WITH REMOVABLE TIE RODS

BACKGROUND OF THE INVENTION

1. Field of the Invention

The invention pertains to large, high tonnage injection molding apparatus wherein mold parts are maintained in contiguous relationship during molding and separated to release the molded product, tie rods interconnecting the mold part platens are employed to prevent mold part separation.

2. Description of the Related Art

Injection molding apparatus into which a material in a fluid state is introduced into a mold under high pressure commonly employs separable mold parts relatively movable between open and closed positions. Upon the parts closing, a cavity is defined for receiving the hardenable injected material, and upon the mold parts being opened or pulled apart, the formed product is removed from one of the mold parts.

The fluid material injected into the mold parts is injected under high pressure in order to completely fill the mold cavity, and the internal pressure within the mold cavity tends to separate the mold parts. The greater the area of the cavity, and the larger the part being molded, the greater the forces being imposed upon the mold parts endeavoring to separate them. Commonly, injection molding apparatus includes spaced platens capable of relative movement toward and away from each other, and a mold part is mounted upon each platen. When the platens are separated, the molded product may be removed from the open mold, and when the mold parts are closed after the platens are moved to their closed position, the molding operation occurs. Tie rods interconnecting the platens are commonly employed to resist the forces tending to separate the mold parts and platens during molding. Commonly, the tie rods are in the form of large bolts, usually threaded at one or both ends.

As the tie rods must bridge the space between the platens, the tie rods are located adjacent the mold parts, and in some instances the tie rods, in effect, surround the mold parts. Accordingly, the tie rods interfere with access to the mold parts and the mold part cavity when removing the formed product, and with large formed products, it is often necessary to manipulate the product once removed from the mold part in order to remove the formed product from the confines of the apparatus.

With injection molding apparatus, the larger the size of the mold parts and cavity, the greater the molding pressures, and a greater number of tie rods are required. Hence, considerable difficulty is encountered in removing large injection formed products from large capacity injection molding apparatus due to the presence of the tie rods, and the tie rods limit the dimensions of products which may be successfully formed by injection molding.

Further, the presence of the tie rods causes considerable difficulty when changing dies and mold parts, and it is necessary to either temporarily remove tie rods from the injection molding apparatus, or space the tie rods sufficiently from each other to permit the heavy mold parts to be properly positioned on the platens.

Access to the interior of the platens for mounting the mold parts thereon has been improved by temporarily releasing one end of the tie rods from a platen, and such molding apparatus is shown in U.S. Pat. Nos. 4,172,872; 4,948,358 and 4,984,980. However, such molding apparatus is not of such construction as to quickly clear the tie rods from the molding parts and provide full access to both of the mold parts.

It has also been known to use hydraulic forces to produce tension forces within the tie rods to improve mold clamping pressures as shown in U.S. Pat. Nos. 4,948,358; 4,984,980 and 5,066,217, but in these patents the tie rods do not sufficiently clear the mold part area to provide the combination of high mold clamping forces and mold part access required, especially when forming large size products.

Access to injection mold part cavities has been improved by developing apparatus permitting the platens to pivot from a mold part alignment relationship after the molding has been completed, and such devices also simplify the mounting of the die or mold parts on the associated platen. Such devices are shown in U.S. Pat. Nos. 4,708,625 and 5,033,955. Apparatus of this type utilizes tension bars and frames to resist the mold pressures, but this type of apparatus does not locate the mold clamping forces in the close proximity to the mold parts during molding as is necessary to produce high quality molded products with a minimum of flashing and very accurate mold part alignment.

OBJECTS OF THE INVENTION

It is an object of the invention to provide a method of injection molding wherein large products may be injection molded and yet full access to the mold parts is available.

Another object of the invention is to provide a method of injection molding wherein molding apparatus utilizing tie rods to resist mold part separation permits the tie rods to be retracted to provide full access to the mold cavity permitting ease of removal of the molded product from large cavities.

A further object of the invention is to provide injection molding apparatus capable of withstanding large molding pressures by employing a plurality of tie rods and yet the tie rods are retractable from the proximity of the opened mold parts to permit ease of molded product removal.

Yet another object of the invention is to provide injection molding apparatus of large capacity and dimension capable of relatively short cycle duration and wherein accurate mold alignment is maintained and full access to the opened mold cavity is provided.

An additional object of the invention is to provide injection mold apparatus utilizing retractable tie rods to provide access to the open mold, and wherein the mold supporting platens are capable of pivotal movement to provide lateral mold cavity access.

SUMMARY OF THE INVENTION

The concepts of the invention are particularly suitable, though not limited to, horizontally related injection molding apparatus wherein two platens mounted upon a frame are relatively horizontally movable toward and away from each other wherein a mold part mounted upon each platen may mate with the other in contiguous relation during a mold closed position, and separate in a mold open position permitting removal of the molded product from the mold cavity. Tie rods interposed between the platens during the closed molding operation prevent the platens and mold parts from separating due to the high pressures within the mold cavity.

In the practice of the invention, the tie rods are supported upon one of the platens for axial translation in a direction parallel to the platen movement during mold opening and closing, the tie rods being axially displaceable with respect to both platens and having outer free ends selectively locked to the opposed platen. The tie rods are axially displaced with respect to both platens during relative platen movement in either direction, i.e. the tie rods move in the same direction as the platen upon which they are mounted and may move at a different linear velocity. The rate of tie rod movement relative to the rate of associated platen movement may be such that the tie rods will be bridging both platens upon the molds being closed, and thereupon the tie rods are locked to each platen in a manner capable of permitting the tie rods to prevent separation of the platens during molding. After the molding operation is completed, the tie rods are unlocked with respect to each platen, and may retract as the platens separate to open the mold parts. The tie rods may be retracted after the associated platen is fully retracted or the rate of tie rod retraction may be greater than the relative rate of platen separation whereby the free ends of the tie rods will be withdrawn from proximity to both mold parts upon the platens and mold parts being fully opened.

The tie rods are locked to the platens by hydraulically operated locking structure. At their free ends, the tie rods are received within platen mounted nut devices utilizing thread type cam surfaces cooperating with thread surfaces mounted upon the tie rod ends to prevent relative axial movement between the tie rod free end and the associated platen.

At the other platen, annular hydraulically operated pistons bear against nuts adjustably mounted upon threads defined on the tie rods to produce preliminary tensioning of the tie rods prior to molding and resist the molding forces tending to open the mold parts.

When unlocked relative to the platens, the tie rods are capable of rapid simultaneous axial translation by an anti-friction ball nut linear drive arrangement powered by an electric or hydraulic motor capable of axially translating the tie rods at a faster rate than the associated platen movement.

The retraction of the free ends of the tie rods from proximity of the open mold cavity permits the molded product to be easily removed from the mold cavity manually or mechanically by a robot, or the like, and it is not necessary to move the molded product through a variety of gyrations to avoid interference with the tie rods as is required with conventional injection molding apparatus of a large size. Further, the retraction of the tie rods from proximity to the mold permits the mold parts to be readily positioned between their supporting platens when setting up the injection apparatus, or removing the mold parts therefrom. Conventional lift trucks or hoists may be employed to position the heaviest mold parts between the platens without requiring special equipment and set up and tear-down times are substantially reduced as compared to conventional injection molding apparatus.

In a variation of injection molding apparatus employing the inventive concepts, the platens are mounted upon rotatable turntables whereby after the platens are fully separated and the tie rods retracted, the platens may be rotated from the mold alignment position permitting open lateral access to the mold cavity further improving accessibility to the mold cavity for removal of the molded product, or to permit maintenance work upon the molds. Such pivotal structure substantially improves the safety aspects of large injection molding equipment eliminating the necessity for the mold worker to position himself between opposed mold parts.

The concepts of the invention permit larger injection molding apparatus to be constructed than heretofore practical, and the inventive concepts open up new horizons in the injection molding art.

BRIEF DESCRIPTION OF THE DRAWINGS

The aforementioned objects and advantages of the invention will be appreciated from the following description and accompanying drawings wherein:

FIG. 13 is an enlarged detail elevational view of the platen lock cam nut structure illustrating a tie rod entering the associated platen, FIG. 14 is a sectional view of the tie rod end, per se, as taken along Section 14—14 of FIG. 13, FIG. 15 is a sectional view of the lock cam nut, per se, as taken along Section 15—15 of FIG. 13.

DESCRIPTION OF THE PREFERRED EMBODIMENTS

Preferably, the injection molding apparatus of the invention is mounted in a horizontal orientation, but it is possible that the inventive concepts could be incorporated into a vertically oriented system, and for purpose of description, the preferred horizontal orientation is illustrated.

Figure 7:
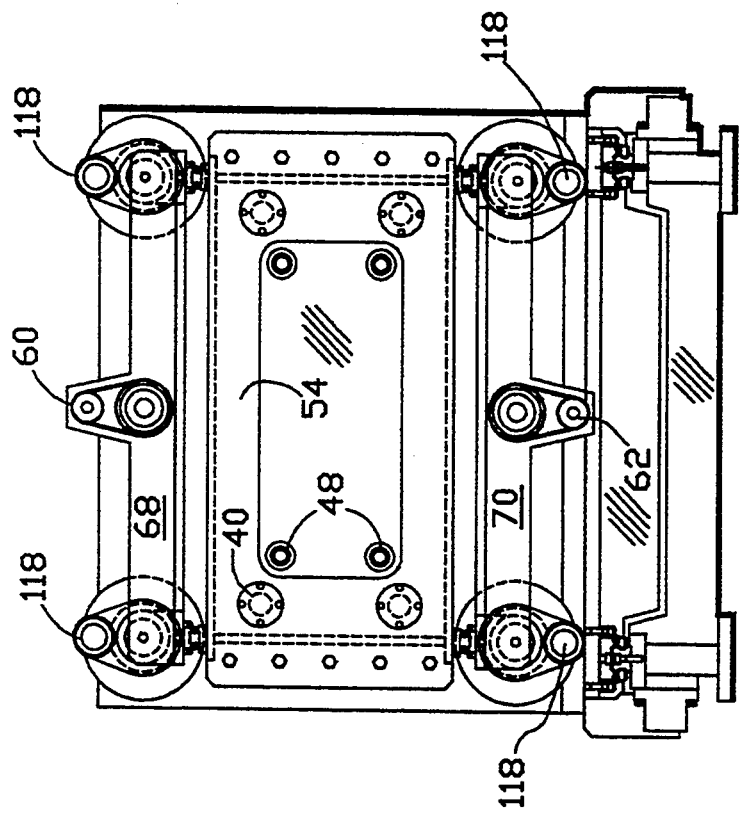
FIG. 7 is an end elevational view of the injection molding apparatus as taken from the left end of FIG. 1.
Figure 8:
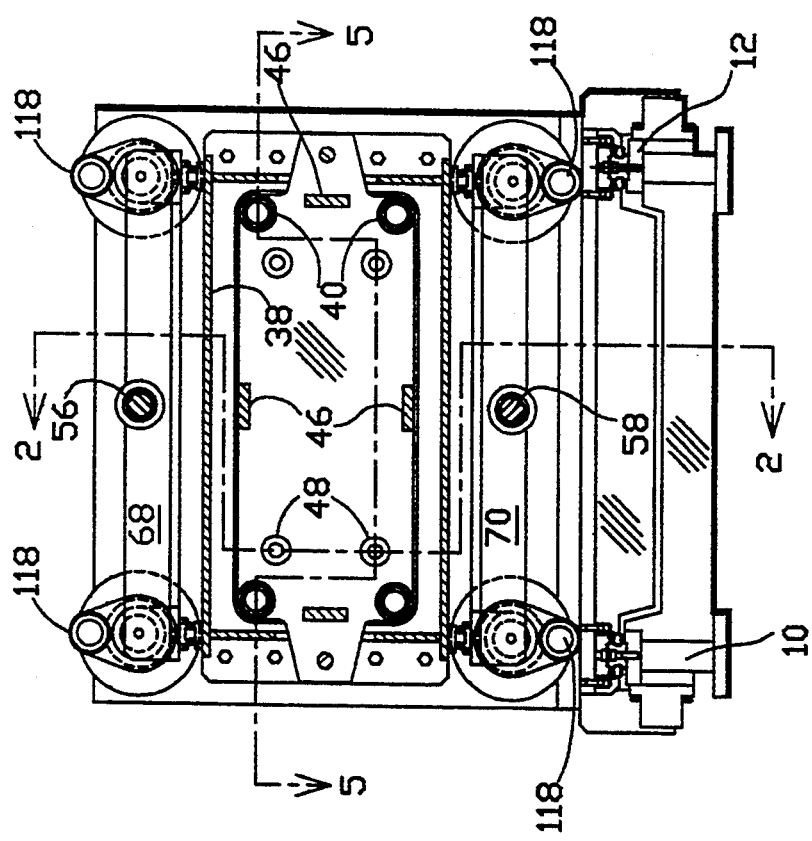
FIG. 8 is an end elevational sectional view as taken along Section 8—8 of FIG. 4.

The injection molding apparatus is mounted upon a heavy duty elongated frame 10 which includes a plurality of longitudinal rails, at least two, FIGS. 7 and 8, and the rails include upper ways 12. Basically, the injection molding apparatus includes platens 14 and 16 movably mounted upon the ways 12, and the platen 14 constitutes the support for the mold part 18, while the platen 16 supports the mold part 20. The mold parts are shown in phantom lines.

The platens are bridged by a plurality of tie rods 22 during the molding operation, the illustrated embodiments disclosing four tie rods, and it is to be understood that the concepts of the invention permit a greater number of tie rods to be used as required by the particular mold capacity used and internal pressures existing.

The material being injected into the mold is introduced into the mold part 20 through the injector barrel 24, and the injector barrel is associated with conventional injection molding apparatus, not shown, such as used to prepare synthetic plastic, aluminum, zinc, white metal, or any other material capable of being injection molded.

The platen 14 is mounted upon a platen carriage 26 having way structure for cooperating with the frame ways 12, and the platen carriage 26, and platen 14, are moved along the ways 12 by two hydraulic cylinders 28 mounted upon the frame 10 each including an extendible and retractable piston 30 attached to the carriage 26. In a like manner, the platen 16 is mounted upon a platen carriage 32 mounted upon the frame ways 12, and is adjusted thereon by the frame mounted cylinders 34 each having a movable piston 36 attached to the carriage 32. As will be appreciated from the drawings, the length of cylinder 28 is considerably greater than the length of cylinder 34 in that cylinder 28 is used to translate the platen 14 between mold open and closed positions, while the cylinder 34 is only used to produce relatively small adjustments in the position of the platen 16 for alignment and clearance purposes, particularly with respect to the injector barrel 24.

Figure 1:
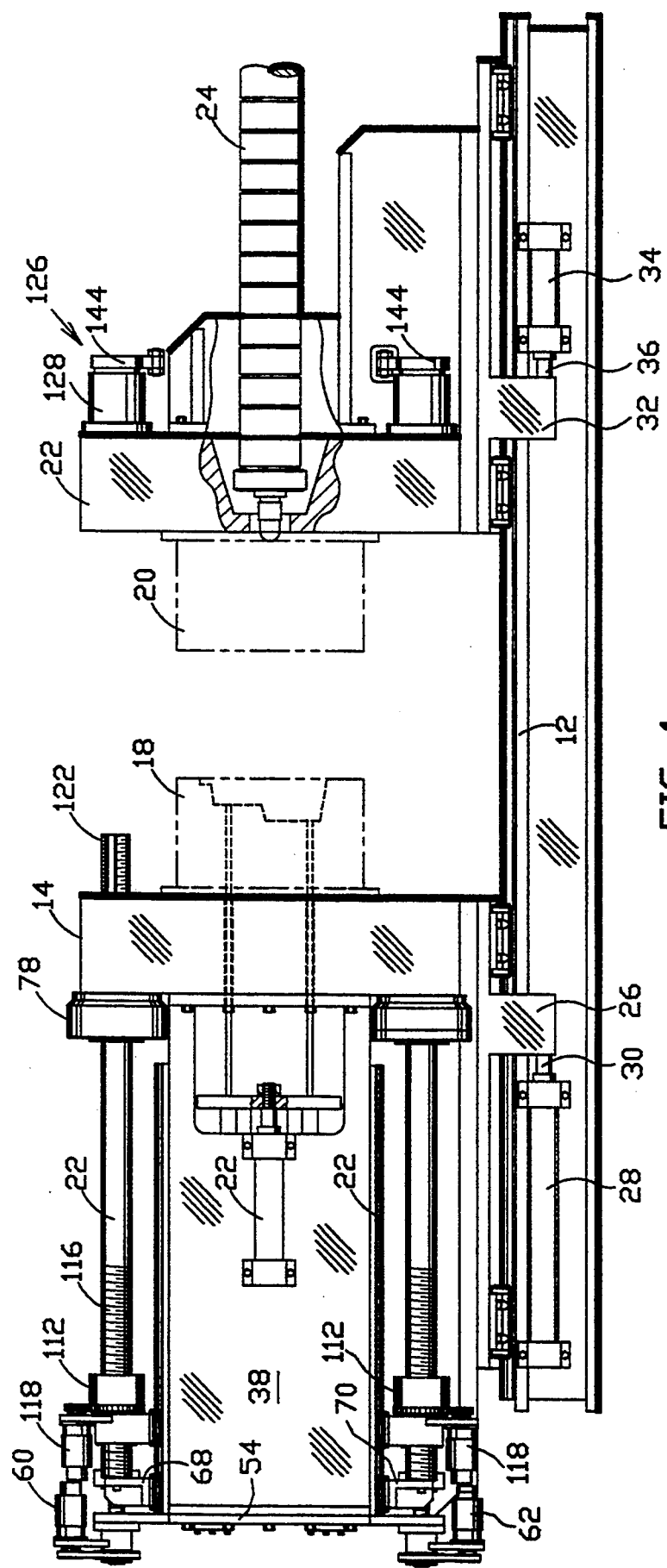
FIG. 1 is a side elevational view of injection molding apparatus in accord with the invention illustrating the platens separated, the tie rods retracted, and the right platen partially sectioned to illustrate the relationship between the injector barrel and the adjacent mold, the mold parts being shown in phantom lines.
Figure 2:
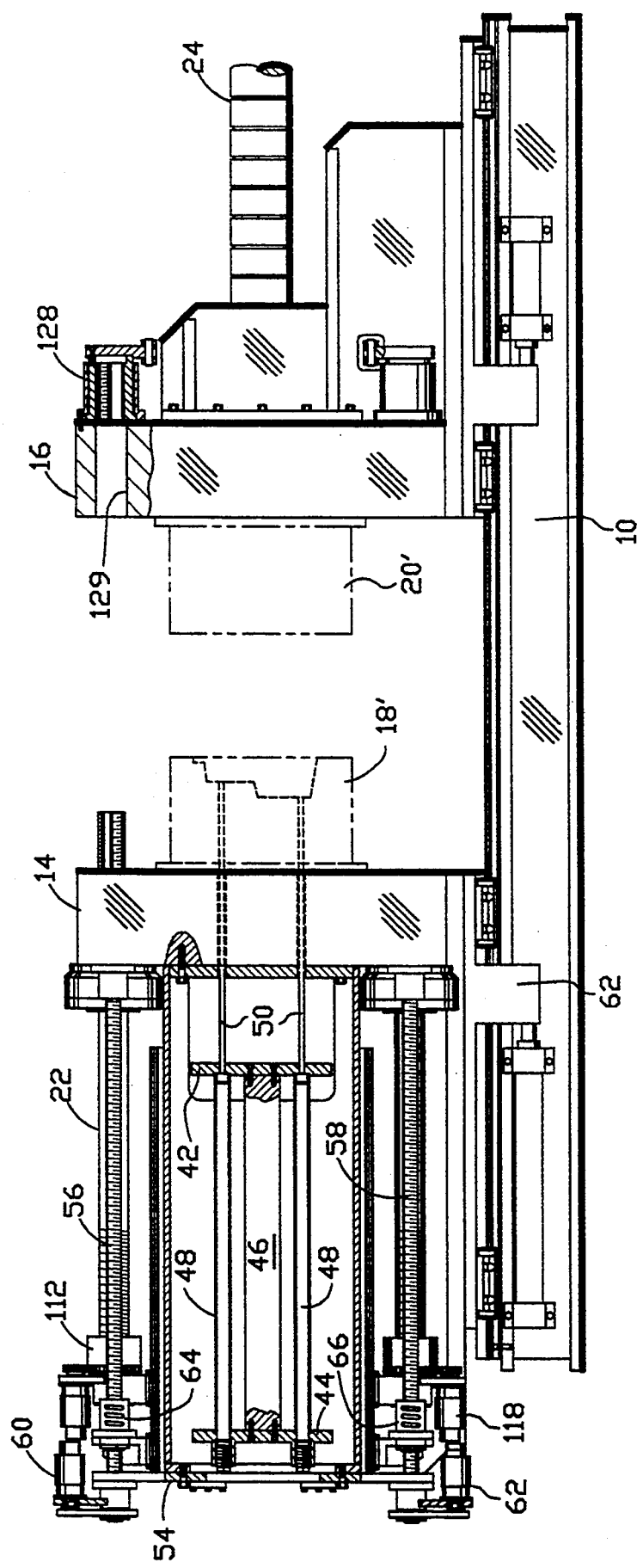
FIG. 2 is an elevational sectional view with the components being in the relationship of FIG. 1 as taken along Section 2—2 of FIG. 8.

A cage 38 is mounted upon the platen 14 and extends to the left thereof as viewed in FIGS. 1 and 2 and four guide rods 40 extend between the cage end plate and the platen 14 for supporting the front ejector plate 42 and the rear injector plate 44 for axial translation thereon. Spacer bars 46 are interposed between the plates 42 and 44 for maintaining the spacing therebetween. A plurality of ejector pin spacer bars 48 are mounted upon the plates 42 and 44, and each bar 48 supports an ejector pin 50 which extends through the platen 14 and into the mold part 18 wherein the ejector pins 50 are used to push the formed molded product from the cavity of the mold part 18, as is well known. The location of the bars 48 and pins 50 is determined by the particular configuration of the cavity within the mold parts. Hydraulic cylinders 52 mounted upon the cage 38 each have a piston connected to the ejector front plate 42 and extension of the pistons of cylinders 52 translates the ejector pins 50 relative to the mold part 18 for pushing the hardened molded product from the cavity thereof.

The cage end plate is represented at 54 and supports the left end of the guide rods 40, and the end plate 54 supports the left end of the upper and lower ball screw shafts 56 and 58, respectively, while the platen mounted supports 59 receive the right end of the shafts. The upper ball shaft 56 is rotated by motor 60 through a belt driven transmission, and in a like manner, ball shaft 58 is bi-directionally rotated by the motor 62. The motors 60 and 62 may be either electric or hydraulically powered. A ball nut 64 is mounted upon shaft 56, while a ball nut 66 is mounted upon shaft 58, and a yoke 68 is connected to the ball nut 64, while a yoke 70 is mounted upon the ball nut 68, FIG. 7. The left ends of the tie rods 22, FIG.

Figure 11:
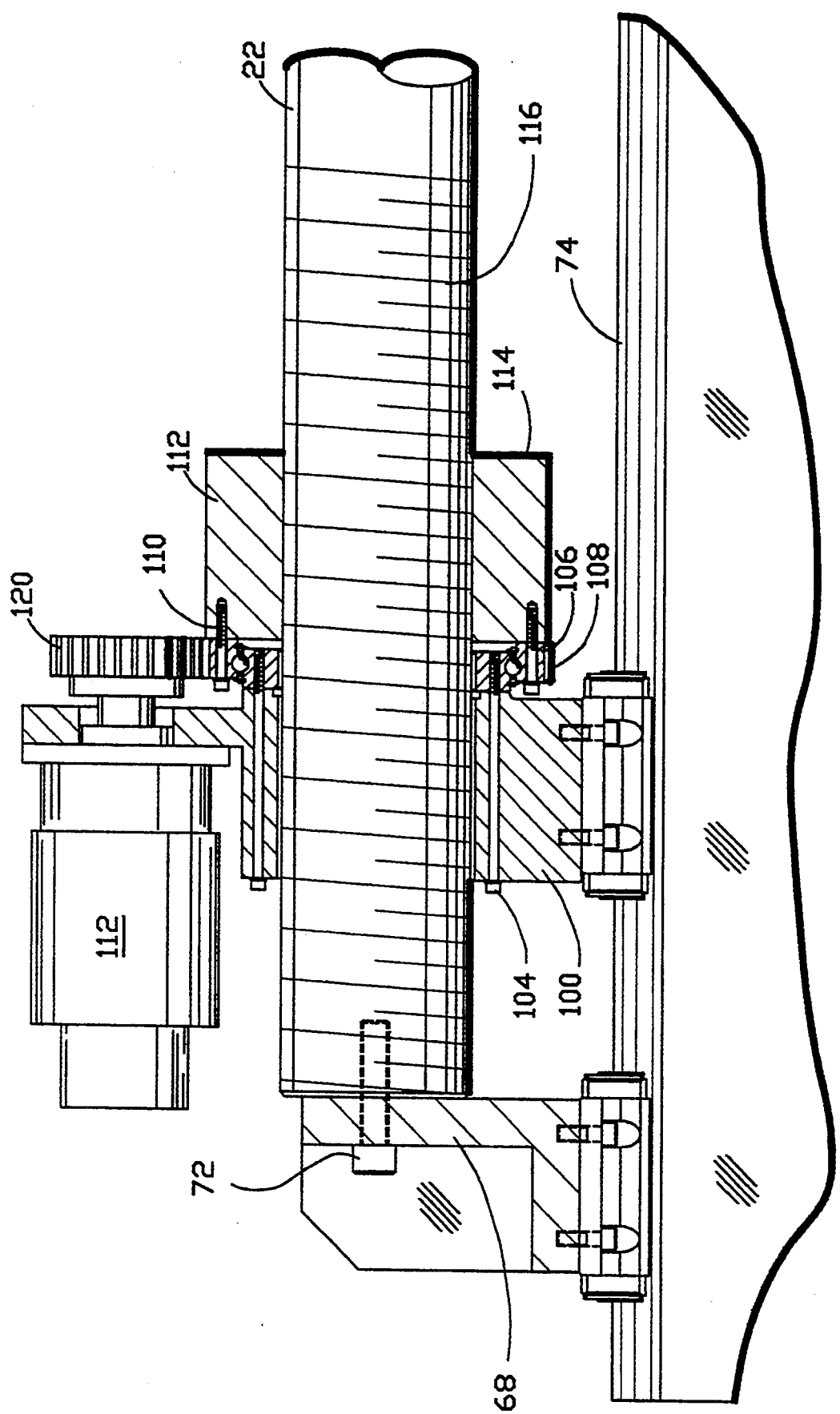
FIG. 11 is an enlarged detail sectioned elevational view of the tie rod locking nut structure and mold height adjusting mechanism as taken along Section 11—11 of FIG. 4.

1, are mounted upon the ends of the yokes 68 and 70, FIG. 11, by bolts 72, and the yokes 68 and 70 are supported at their outer ends by roller bearing rails 74 mounted upon the cage 38 as shown in FIGS. 7 and 8.

Figure 6:
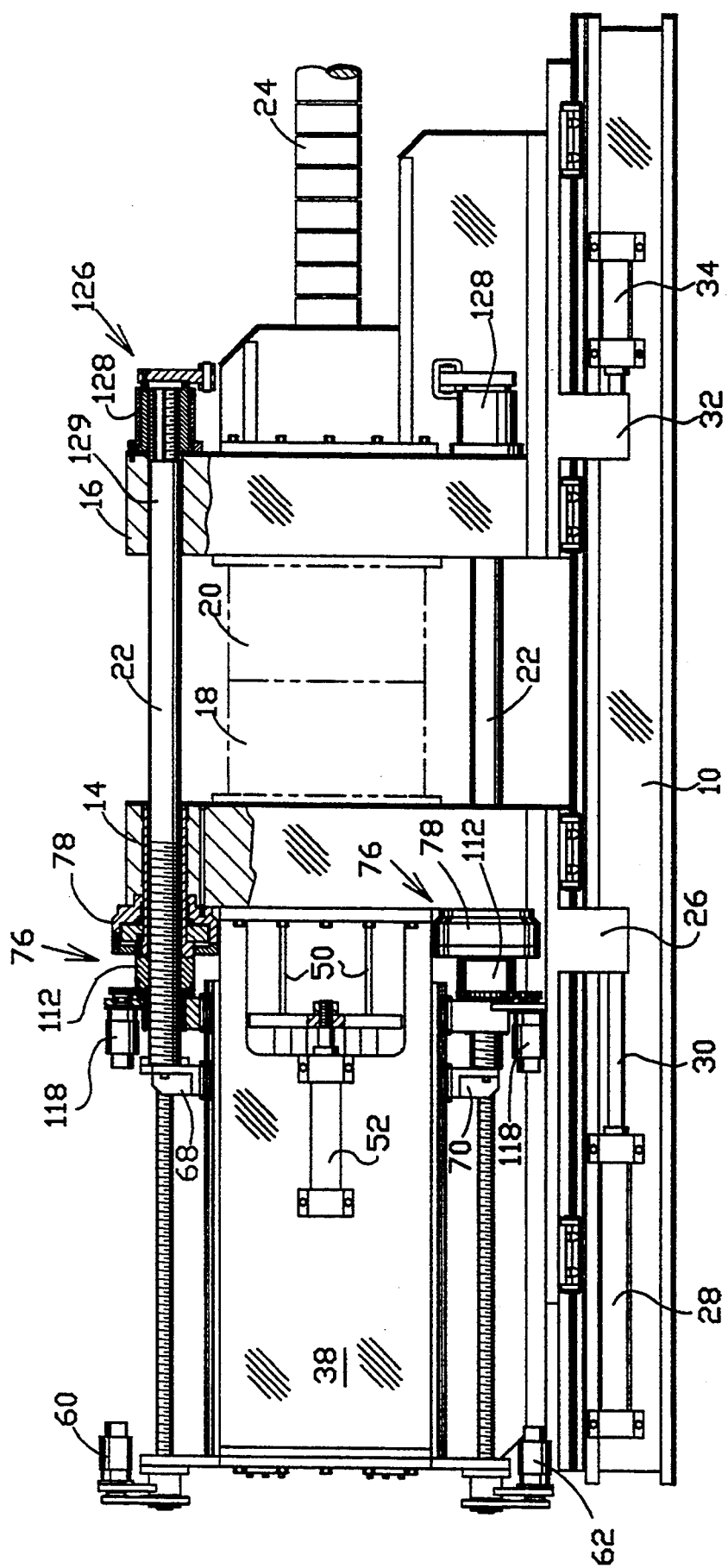
FIG. 6 is an elevational side view generally similar to FIG. 3 illustrating the platen and mold parts in a closed condition, the tie rods being fully extended to bridge both platens, and the tie rods being locked to the platens.
Figure 12:
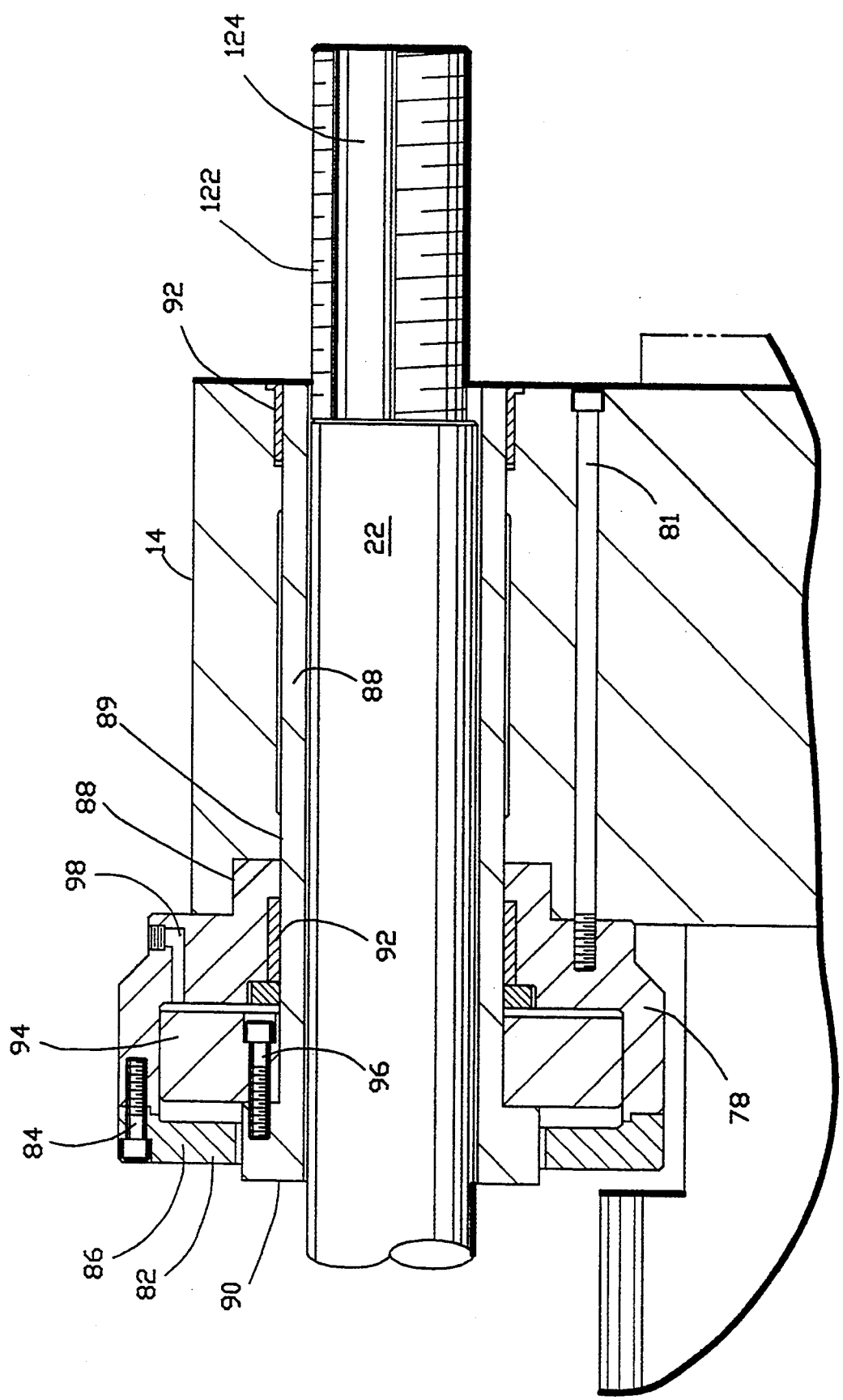
FIG. 12 is an enlarged detail elevational sectional view of the mold locking cylinders illustrating the piston in a retracted position as taken along Section 12—12 of FIG. 4.

The tie rod locking structure associated with platen 14 is generally indicated at 76 in FIG. 6. This locking structure includes an annular housing 78, FIG. 12, surrounding the associated tie rod 22, and the housing 78 is received within an annular countersunk recess 80 defined within the platen 14 and held therein by bolts 81. The housing 78 includes an annular cover 82 mounted to the housing by a plurality of bolts 84, and a chamber 86 is defined within the housing 78. An elongated piston rod sleeve 88 of tubular configuration is received within a bore 89 defined within the platen 14 and includes an end 90. The sleeve 88 is mounted within bearings 92 and is capable of limited axial displacement within the platen 14. An annular piston 94 located within chamber 86 is bolted to the piston rod sleeve 88 by bolts 96, and an oil passage 98 defined in housing 78 permits pressurized oil to communicate with the chamber 86 on the right side of the piston 94, FIG. 12, and upon the chamber 86 being pressurized to the right of piston 94 the piston rod sleeve 88 will be forced to the left until the piston 94 engages the cover 82.

The other portion of the tie rod lock structure 76 is illustrated in FIG. 11 and includes a truck 100 axially translatable upon the roller bearing rails 74. The truck 100 supports an annular inner ball bearing race 102 by means of bolts 104 and a plurality of roller ball bearings engaging race 102 support the annular outer race 106 having gear teeth 108 defined thereon. A plurality of bolts 110 attach the annular nut 112 to the outer race 106 for rotation therewith, and the nut 112 includes a transverse end 114.

The tie bars 22 include threads 116 which mate with the threads of the nut 112, and a motor 118, either of the electrical or hydraulic type, mounted upon the truck 100 drives a gear 120 meshing with the outer race 116 to selectively rotate the nut 112. Accordingly, by operation of the motor 118 the nut 112 may be axially positioned along the tie rod threads 116 as desired, for a purpose later described.

The outer, or right, ends of the tie rods 22 are threaded at 122, and are longitudinally notched at 124, FIG. 14, wherein the tie rod ends constitute thread type cam surfaces, three segmental, circumferential and longitudinally extending thread cam portions being defined upon each tie rod end.

The tie rod locks associated with the platen 16 are generally designated at 126, and each includes an annular sleeve 128, FIG. 13, which is concentrically aligned with the platen bore 129 and bolted to the platen 16 by bolts 130 wherein the sleeve 128 is firmly held against the platen surface 131. Bearings 132 within the bore of sleeve 128 rotatably support the annular cam nut 134 and the cam nut 134 includes a circular bore 136 and thread segments 138, FIG. 15, wherein the notches 140 exist between the circumferentially spaced cam thread portions 138. The threads 138 within the cam nut 134 correspond to the thread segments 122 defined on the ends of the tie rod.

Figure 10:
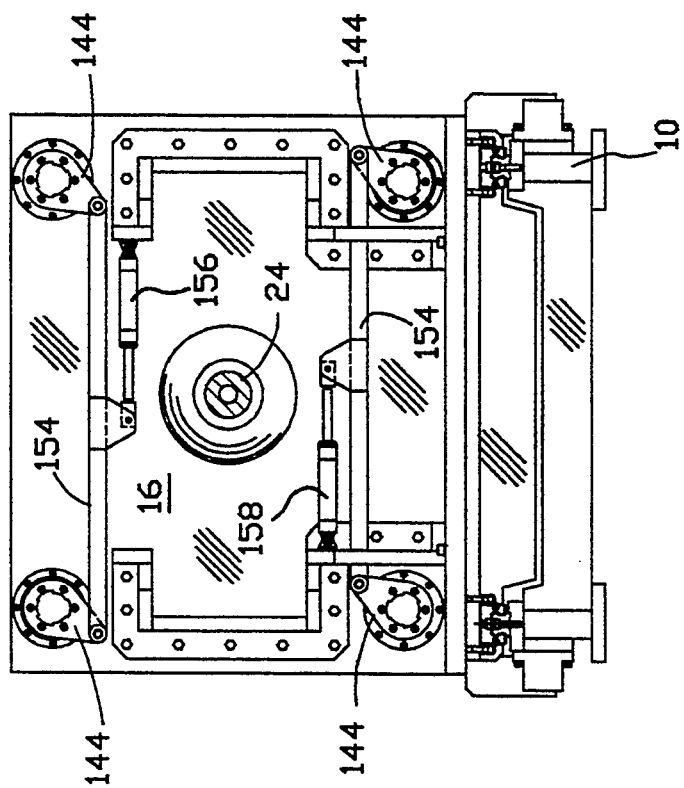
FIG. 10 is an end elevational view similar to FIG. 9 illustrating the locking yokes in the locked position.
Figure 9:
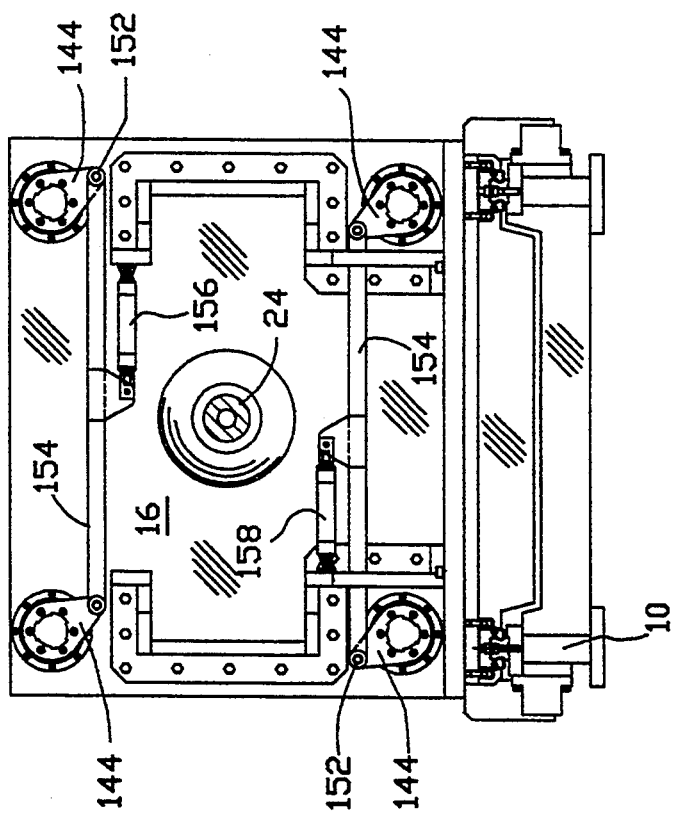
FIG. 9 is an elevational end view of the right end of the apparatus as shown in FIG. 1, illustrating the platen lock yokes in the unlocked position.
Figure 17:
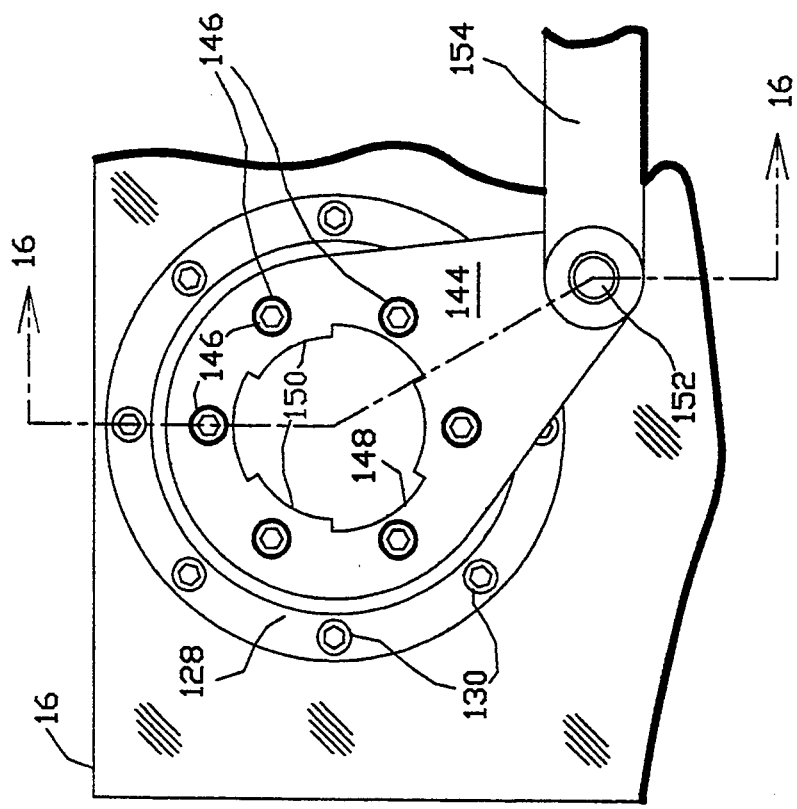
FIG. 17 is an end elevational view of FIG. 16 as taken from the right thereof.

The cam nut 134 includes a transverse end 142 which, upon axial displacement of the cam nut 134 to the left, FIG. 13, will directly abut against the platen surface 131. Rotation of the cam nut 134 is accomplished by a yoke 144 fixed to the cam nut by bolts 146, and the yoke 144 includes a bore 148, FIG. 17, having projections 150 adapted to align with the tie rod notch segments 124, if necessary. The yoke 144 includes a radially extending arm portion in which the pin 152 is mounted for pivotally attaching the link 154 to the yoke. As will be noted from FIGS. 9 and 10, the upper link 154 is connected to the piston of a hydraulic cylinder 156 mounted upon the platen 16, while the lower link 154 is connected to the piston of a cylinder 158. Accordingly, retraction of the cylinders 156 and 158 will cause the yokes 144 to be positioned as shown in FIG. 9, while extension of the pistons of the cylinders 156 and 158 will rotate the yokes to the locked position shown in FIG. 10.

DESCRIPTION OF THE OPERATION

Figure 4:
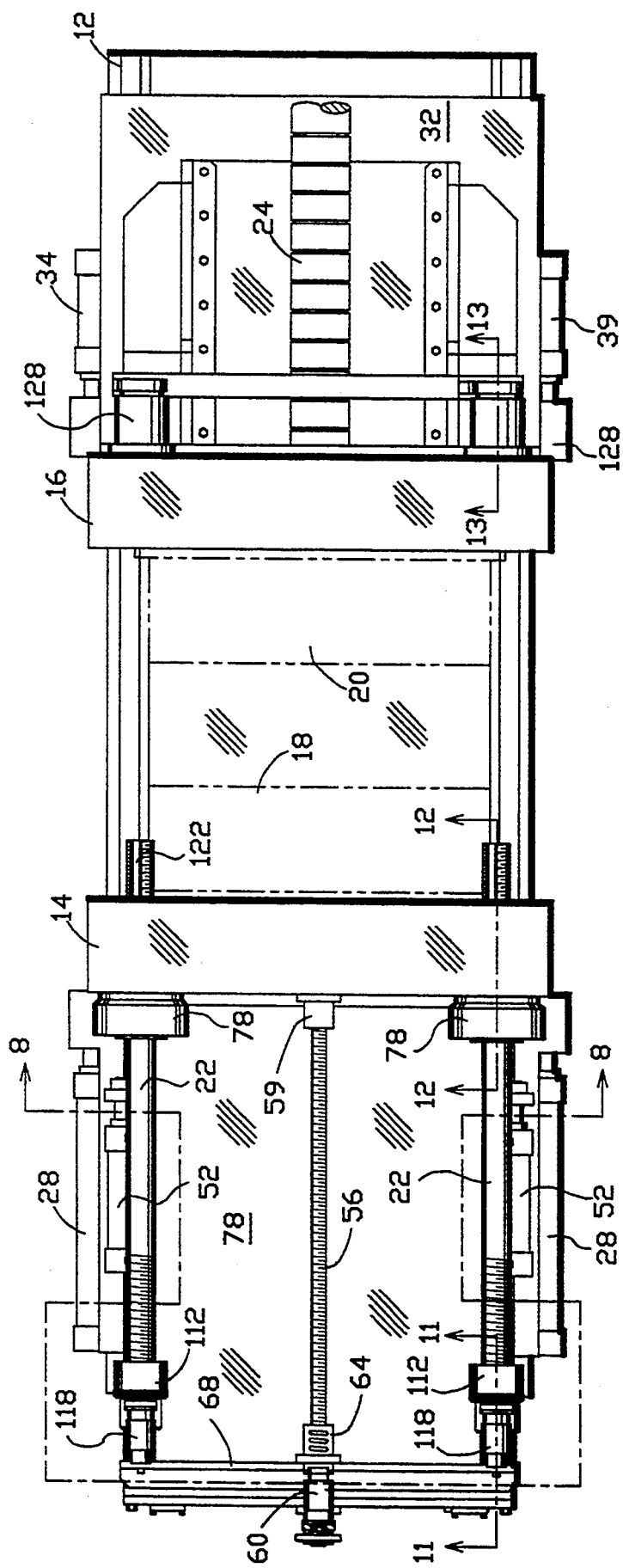
FIG. 4 is a toy plan view of the injection molding apparatus with the components in the relationship of FIG. 1.
Figure 5:
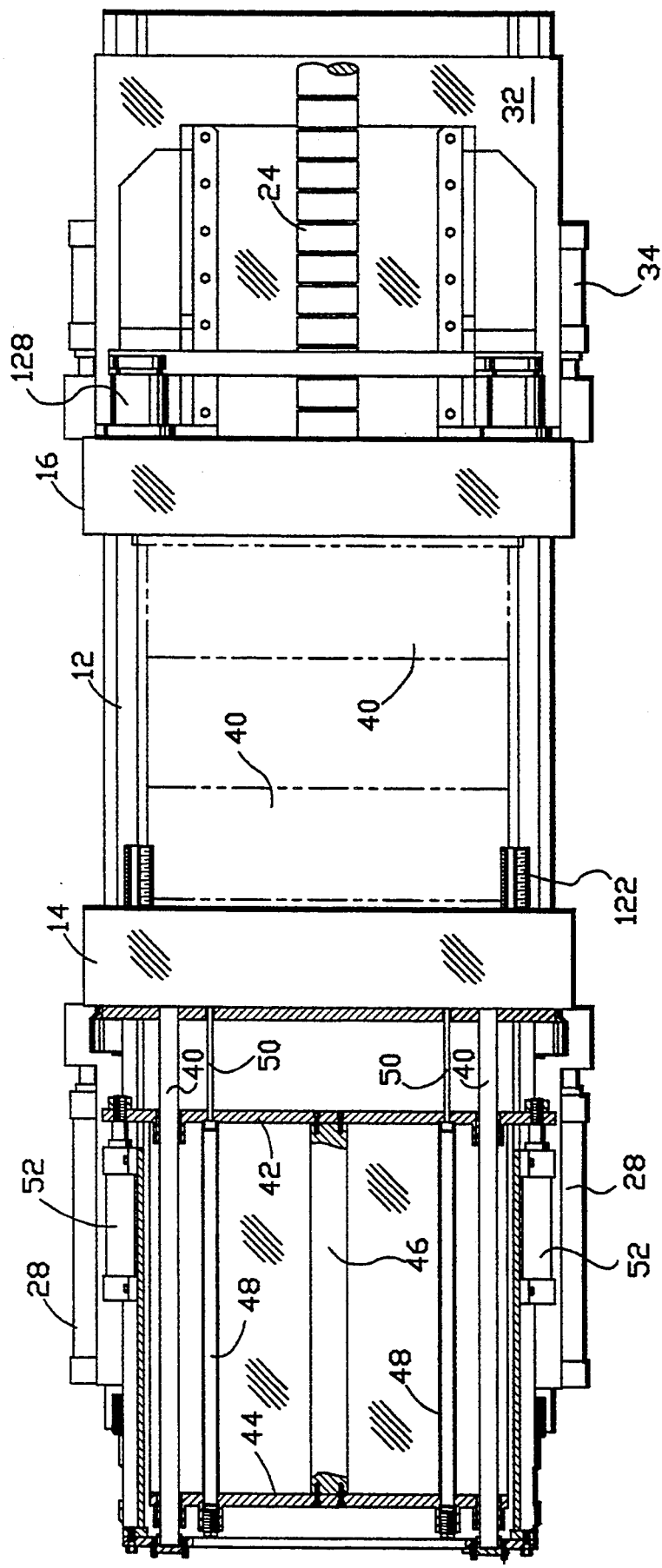
FIG. 5 is a top plan view, the left platen associated structure being shown in section as taken along Section 5—5 of FIG. 8, the platens being open and the tie rods retracted.

Initially, the components of injection molding apparatus in accord with the invention will be in the relationship shown in FIGS. 1, 2 and 4. The platens 14 and 16 will be open or separated to the maximum extent in that the pistons 30 of cylinders 28 will be retracted. Likewise, the motors 60 and 62 will have rotated in that direction which retracts the tie rods 22 the maximum extent to the left, FIG. 1, such that only the threaded ends of the tie rods will be extending to the right of platen 14. Accordingly, as will be appreciated from FIGS. 1, 2 and 4, the space between platens 14 and 16 is fully accessible from the side of the frame 10, or above, and a pre-assembled die set consisting of the mold parts 18 and 20 may be easily positioned between the platens by an overhead hoist, or by a lift truck or the like. The mold or die set is positioned between the platens 14 and 16 as desired, the platen 14 may then be moved to the right by cylinders 28 to clamp the die sets between the platens and the mold parts 18 and 20 may then be respectively bolted to the platens 14 and 16. Because of the ability of the mold parts to be easily positioned between the platens, set-up time for injection molding apparatus using the inventive concepts is substantially reduced, and simplified, as compared to conventional injection molding apparatus.

After the mold parts 18 and 20 have been bolted to their respective platens, the platen 16 will be positioned relative to the injector barrel 24 by cylinders 34 such that the outlet of the injector barrel will communicate with the mold passages in mold part 20, not shown, for distributing the molding material to the die cavity formed when the parts 18 and 20 are mating.

At the beginning of an operative molding cycle, the components will be shown as in FIGS. 1, 2, and 4 in that the previously finished hardened molded product will have been removed from the platen 14 by the ejector pins 50.

Figure 3:
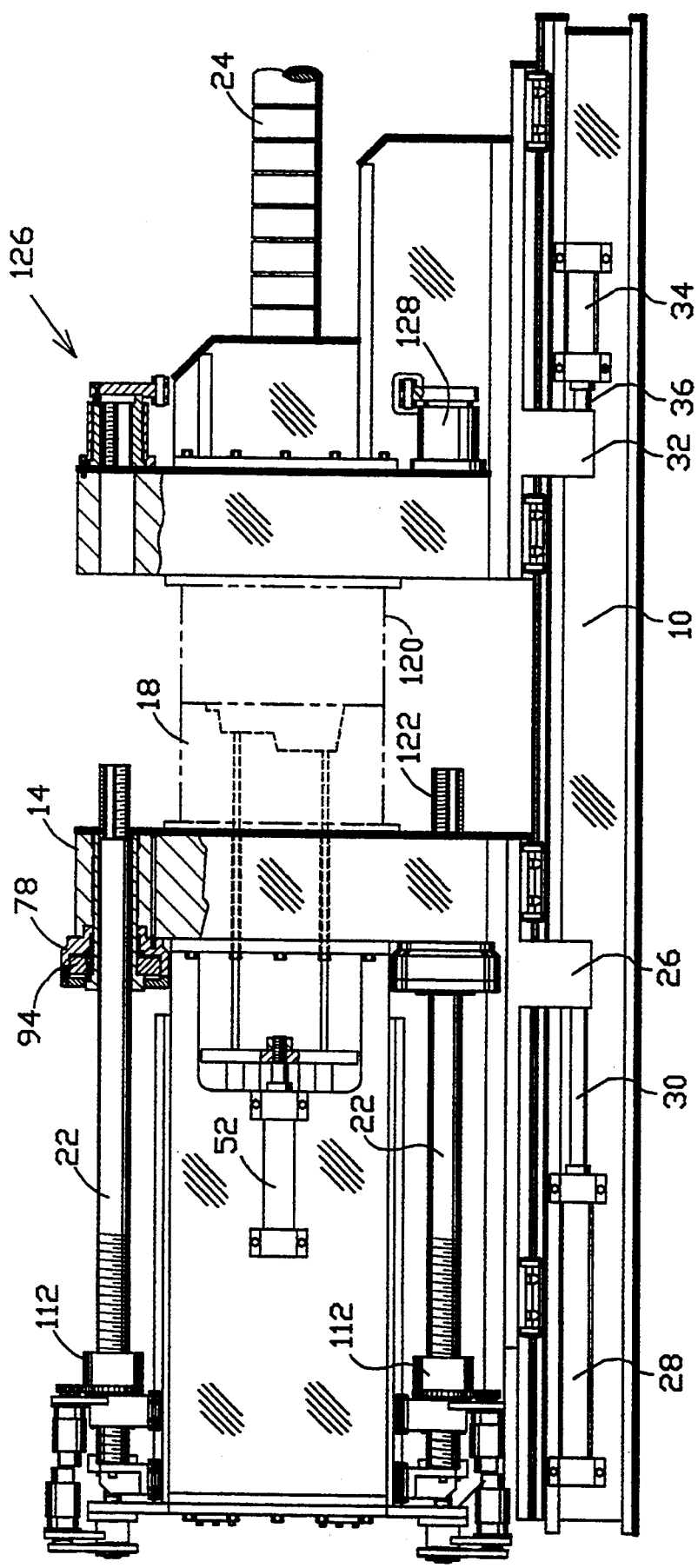
FIG. 3 is an elevational view similar to FIG. 1 illustrating the platens and mold parts in a closed condition, and prior to the tie rods bridging the platens, the upper platen locking structure being shown in section.

The molding cycle begins by the cylinders 28 being pressurized to extend the pistons 30 to translate the platen 14 and mold part 18 toward the platen 16 and mold part 20 such that the mold parts will engage as shown in FIG. 3. During this movement of the platen 14 to the right, it is optional with respect to the control system as to whether the tie rods 22 will be simultaneously axially displaced relative to the platen 14 by the operation of the motor 60 and 62. The molding time cycle can be shortened if the tie rods 22 are being axially translated relative to the platen 14 simultaneously with the movement of the platen 14 to the right. As illustrated in FIG. 3, the tie rods 22 have not been translated to the right relative to platen 14 during movement of the platen toward platen 16.

The cylinders 28 translate the platen 14 and mold part 18 such that the mold parts 18 and 20 will engage.

Figure 16:
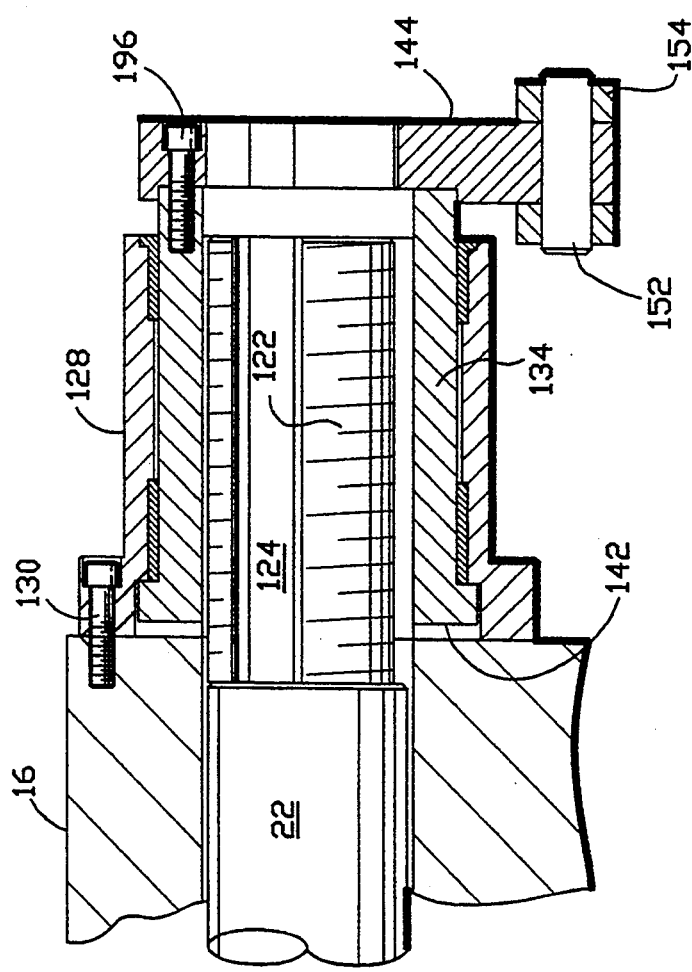
FIG. 16 is an enlarged detail elevational sectional view of the cam nut and the end of the tie rod prior to rotation of the locking yoke to a locked position as taken along Section 16—16 of FIG. 17.

Thereupon, the tie rods 22 are axially displaced to the right, FIG. 3, by the energizing of motors 60 and 62 to insert the outer or free ends of the tie rods through the bore 129 of platen 16, and the tie rod threaded outer ends will be received within the cam nut 134, FIG. 16. Of course, the rotational position of the cam nut 134 at this time is such that the cam nut threads 138 align with the tie rod notches 124, and the tie rod thread segments 122 align with the cam nut notches 140. Accordingly, only a linear displacement between the tie rods 22 and cam nut 134 is required to achieve the relationship shown in FIG. 16.

Figure 19:
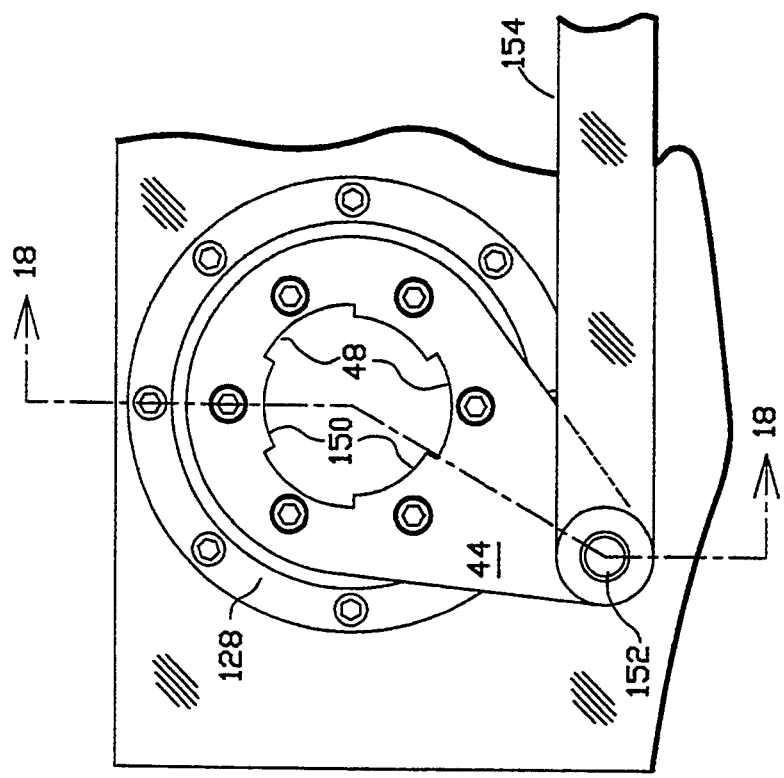
FIG. 19 is an elevational end view as taken from the right of FIG. 18.
Figure 18:
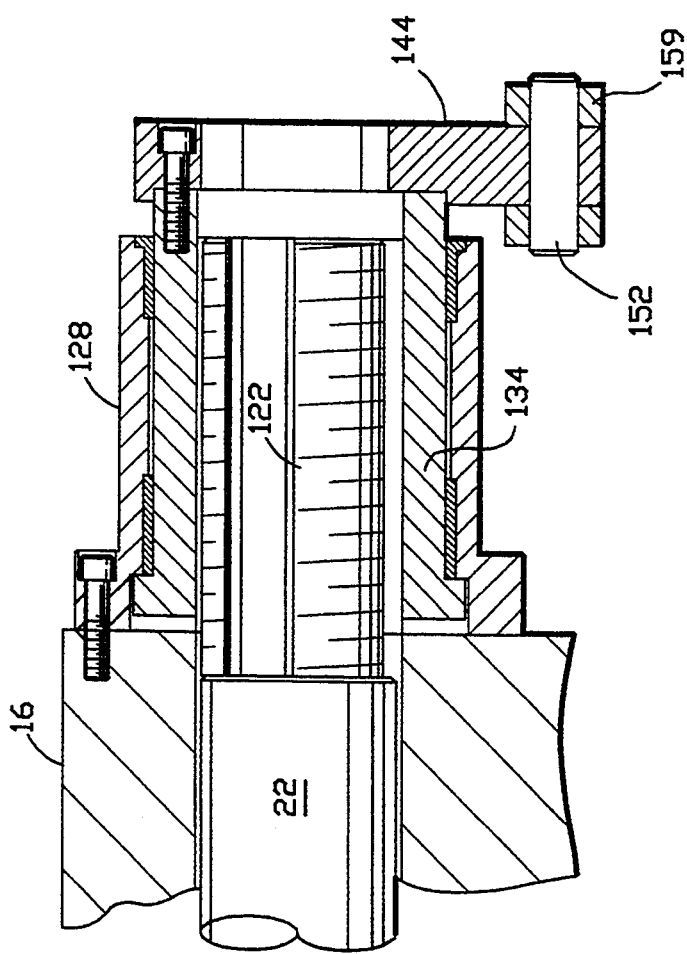
FIG. 18 is an enlarged detail elevational sectional view similar to FIG. 16 illustrating the cam nut in the locked position as taken along Section 18—18 of FIG. 19.

Pressurizing of the cylinders 156 and 158 will translate the links 154 to rotate the yokes 144 in a clockwise direction, FIG. 19, and this clockwise yoke rotation simultaneously rotates the cam nuts 134 engaging the cam nut threads 138 with the tie rod thread segments 122. In this manner, a high strength locking connection between the free ends of the tie rods 22 and the cam nuts 134 has been created even though the yokes 144 have rotated less than 90°.

Simultaneously with, or slightly after, the operation of the tie rod locks 126, the nut 112 will engage the piston rod sleeve 88 mounted within platen 14. Initially, as determined by the dimensions of the mold parts, the nut 112 will be located upon the tie rod threads 116 as desired. Accordingly, when the tie rod locks 126 are engaged, the nut 112 will be so positioned on the tie rods such that the nut surface 114 will be disposed adjacent the piston rod sleeve end 90 and actually engage the sleeve end 90 to displace the piston 94 to the right, FIG. 12. Thereupon, after tie rod locks 126 have been energized, the introduction of pressurized hydraulic fluid into chamber 86 through passage 98 will translate the piston 94 and piston rod sleeve 88 to the left against the nut 112 pre-tensioning the tie rods 22. It will therefore be appreciated that hydraulic pressure within the chambers 86 will tension the tie rods 22 and produce high compressive forces on the mold parts 18 and 20 for maintaining the mold parts in engagement during injection of the mold material into the mold part cavities.

After the tie rods 22 have been tensioned the molding material will be injected into the mold parts through the injector barrel 24, and the mold parts will remain closed until the injected material has filled the mold cavities and hardened, in the conventional manner.

After the molded product has hardened, hydraulic pressure within chambers 86 is released through passage 98 relieving the tension force within the tie rods and the forces on the tie rod locks 126 so that the tie rod locks 126 can be released by operation of the cylinders 156 and 158 to align the tie rod thread segments 122 with the cam nut notches 140. Thereupon, the cylinders 28 retract the pistons 30 to displace the platen 14 and mold part 18 to the left, FIG. 1, and open the mold parts.

As soon as the tie rod locks 126 have been released, the ball screw shaft motors 60 and 62 may be energized to translate the tie rods 22 to the left relative to platen 14 as well as relative to platen 16. As the platen 14 is opening, the tie rods 22 will be fully translated to the left to the position shown in FIGS. 1, 2, 4 and 5 removing the tie rods from proximity to the open cavity of mold part 18. Once the movement of the platen 14 to the left, FIG. 1, is completed, and the tie rods 22 fully retracted, the ejector pin cylinders 52 may be energized to translate the ejector pins 50 to the right and force the molded product from the cavity of mold part 18. As the mold parts 18 and 20 are well separated, FIG. 1, and as the tie rods 22 have been removed from proximity of the mold cavity, the ejected formed product may be easily manually removed from the mold, or mechanical robot devices may be used, as is known.

Of course, the motors 60 and 62 could be energized only after the platen 14 is fully retracted, but the preferred operational sequence is as described above.

After removal of the molded product from the cavity of mold part 18, the cycle is then repeated. The operation of the cylinders and motors of the disclosed apparatus will be controlled by computerized circuitry which forms no part of the present invention. Such circuitry will be of a conventional timing and sequential nature well within the scope of one skilled in the art, and is not illustrated. As discussed above, whether the movement of the platen 14 relative to the translation of the tie rods 22 under the influence of the motors 60 and 62 is sequential or simultaneous is at the option of the operator, and by simultaneously translating the platen 14 and tie rods 22 the mold time cycle can be reduced.

Embodiment of FIGS. 20–30

A variation of injection molding apparatus utilizing the concepts of the invention is shown in FIGS. 20–30, and many of the components of this embodiment are identical to those previously described, and such identical components are indicated by primed reference numerals.

Figure 20:
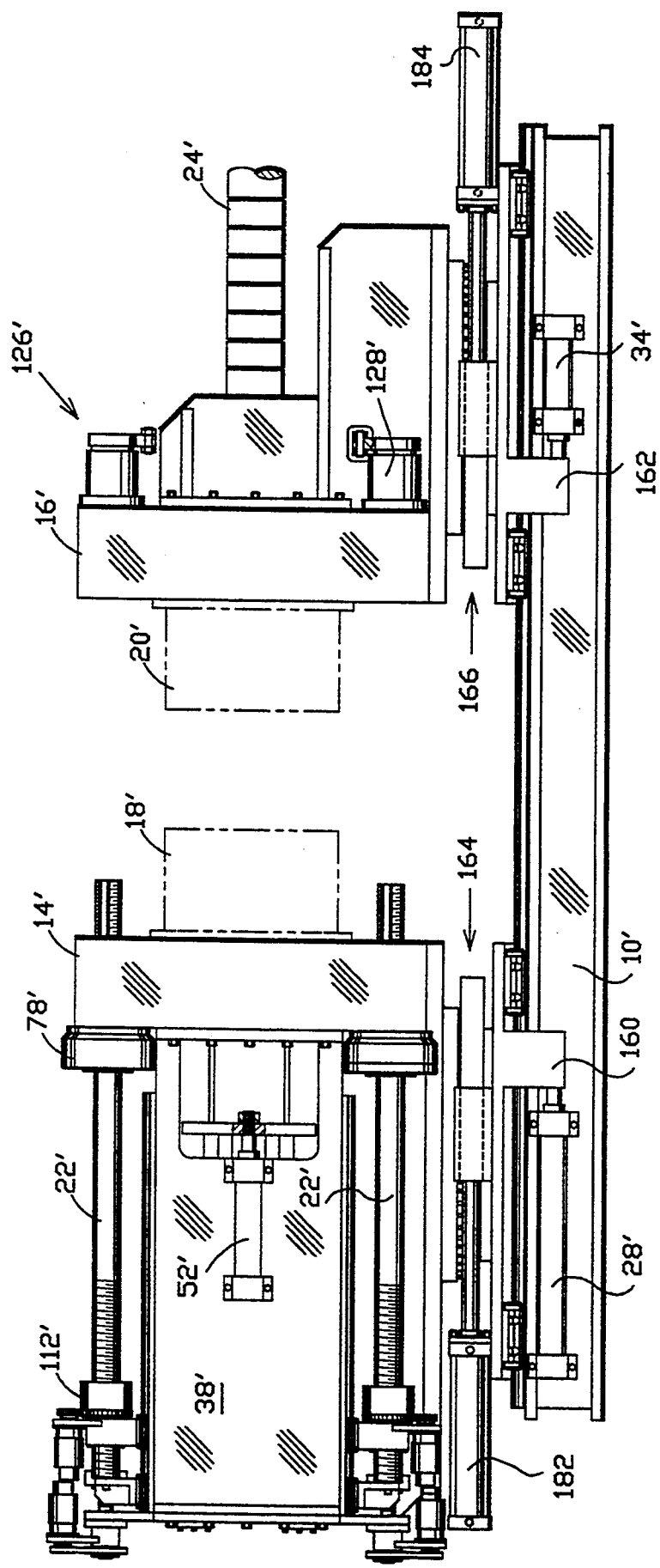
FIG. 20 is a side elevational view of another embodiment of an injection molding apparatus in accord with the invention wherein the platens and mold parts are mounted upon turntable structure capable of pivoting the platens about a vertical axis, the platens and tie rods being illustrated in the open position.
Figure 21:
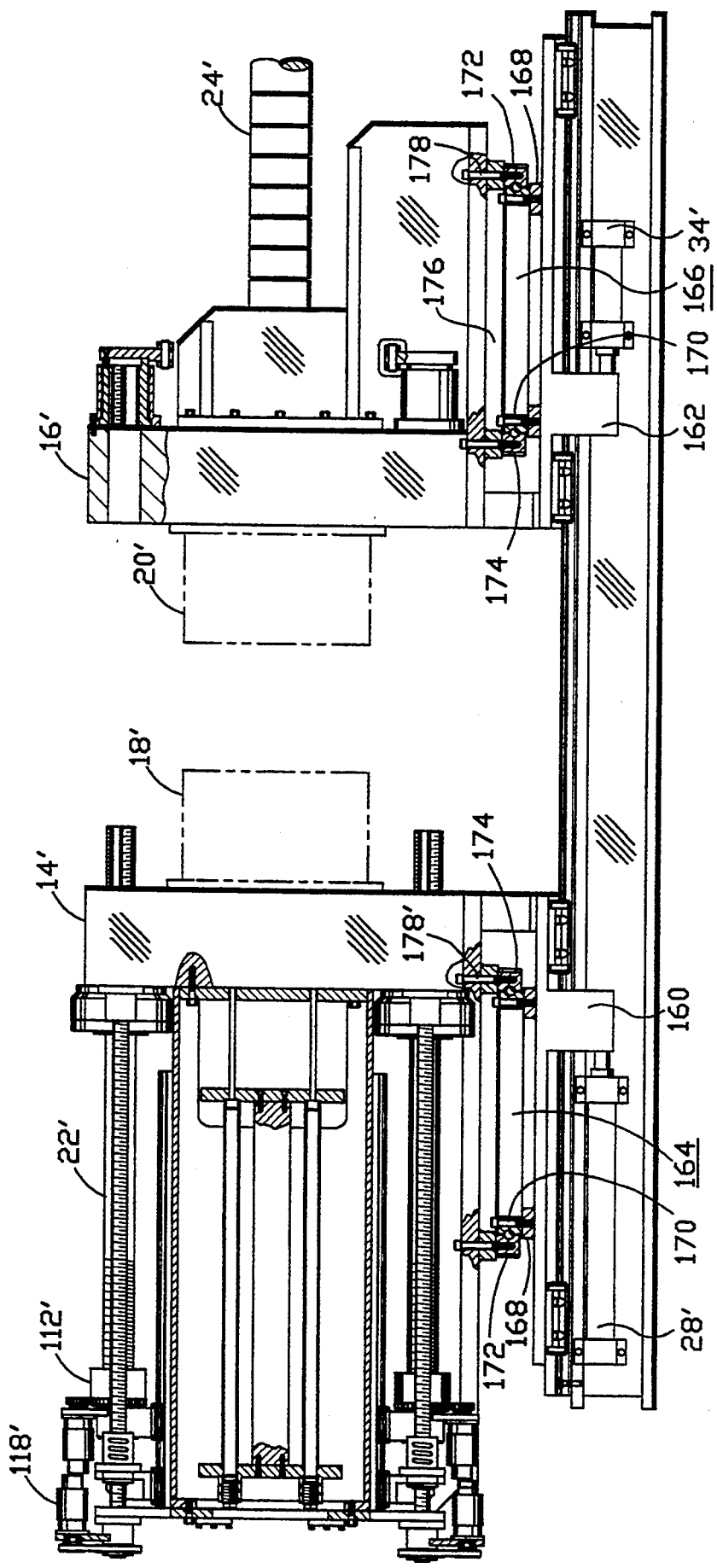
FIG. 21 is an elevational sectional view illustrating the embodiment of FIG. 20 as taken along Section 21—21 of FIG. 28, wherein the section of the left platen structure is identical to that shown in FIG. 2, and wherein the sectioning of the turntable structure is taken along Section 21—21 of FIG. 23.
Figure 22:
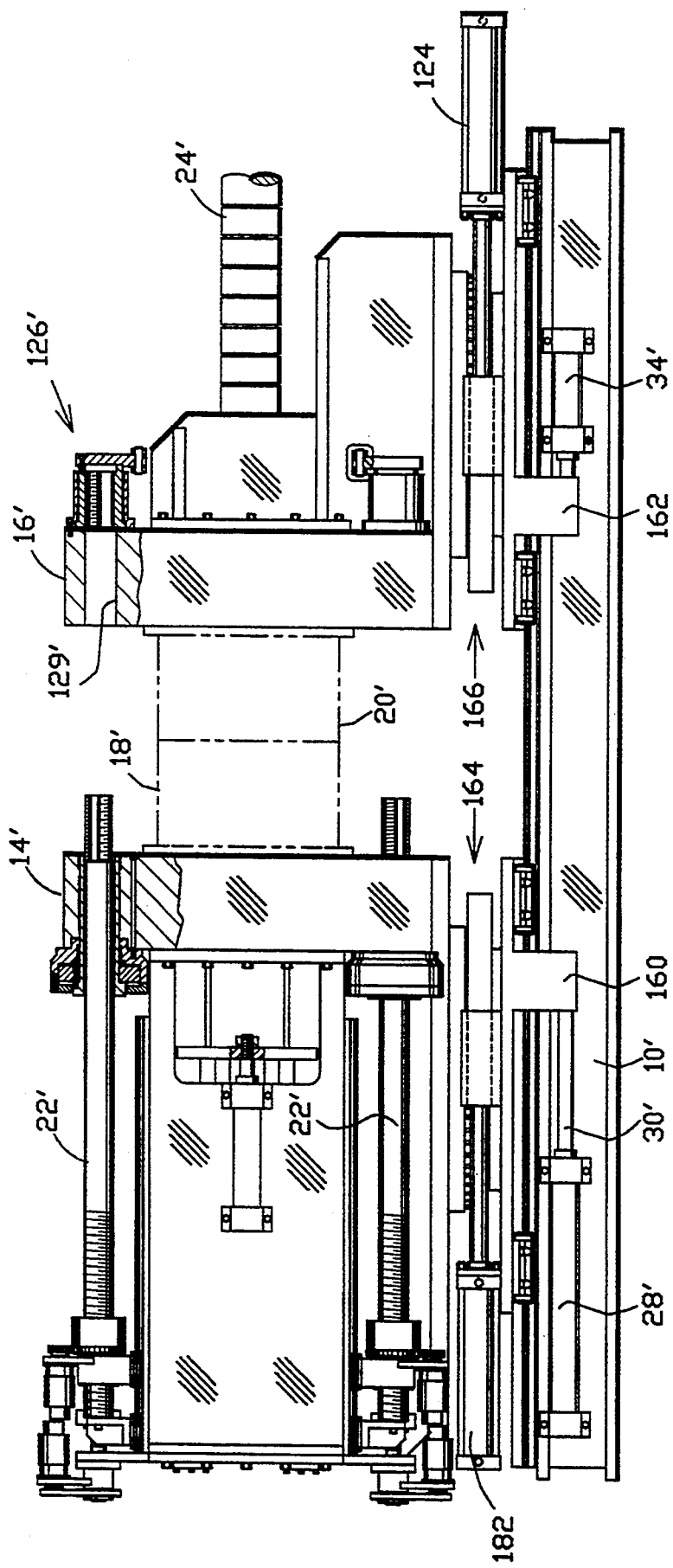
FIG. 22 is a side elevational, partially sectioned, view of the embodiment of FIG. 20 illustrating the platens and mold parts in a closed condition, and prior to extension of the tie rods.

With reference to FIGS. 20–22, a frame 10' is used to support platens 14' and 16' upon each of which is mounted a mold part 18' and 20' as previously described. The platens 14' and 16' are interconnected by tie rods 22' which operate identically as described above. The differences between the embodiment of FIGS. 20–30, and that previously described, result from the use of altered carriages, the platen 14' being mounted upon the carriage 160 translatedly supported upon the frame 10', while the platen 16' is mounted upon the carriage 162.

The carriage 160 includes a turntable generally indicated by reference 164, while the carriage 162 includes the turntable indicated at 166. Each of the turntables includes a lower ring 168 mounted upon the associated carriage, and the ring 168 is bolted to an inner race 170 of an anti-friction bearing. An outer race 172 circumscribes each inner race 170, and the outer periphery of the outer races 172 includes teeth 174. The outer races 172 are connected to the platen support structure by bolts 178, FIG. 21, and in this manner it will be appreciated that the platens 14' and 16' are mounted upon turntables 164 and 166, respectively.

Figure 23:
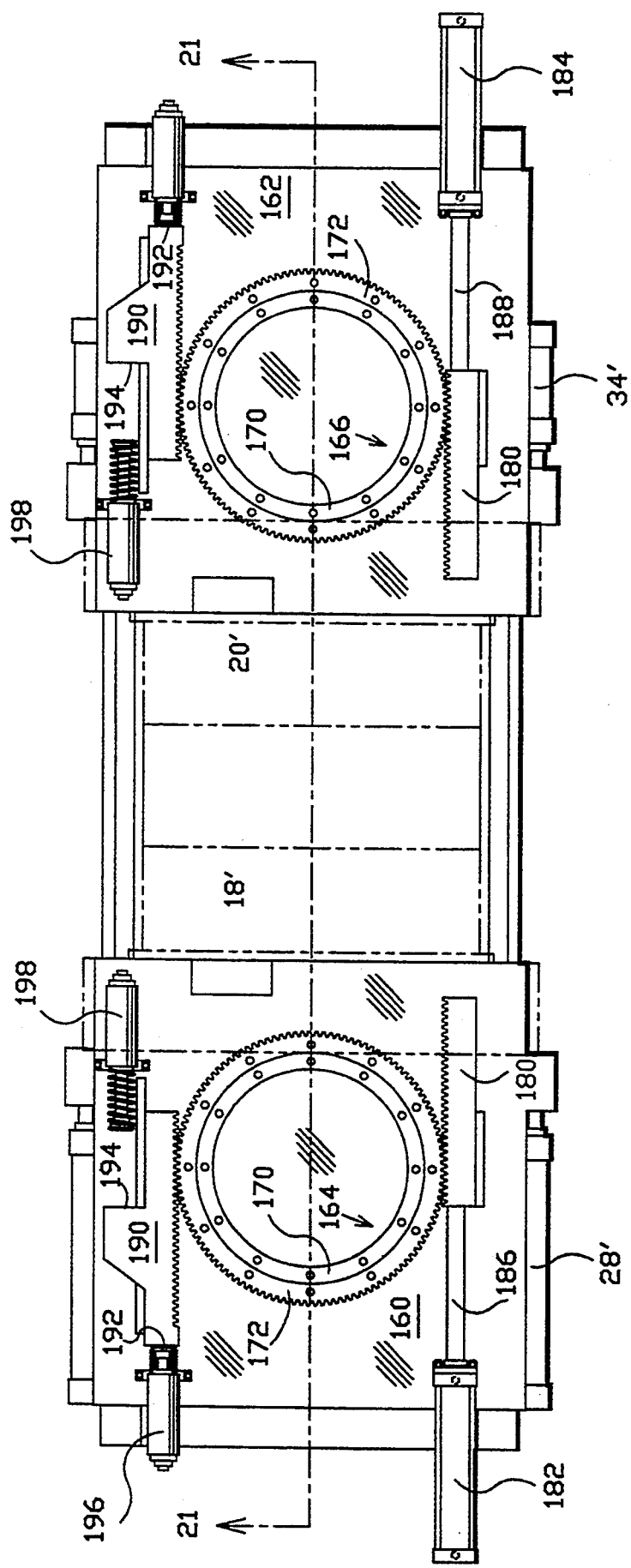
FIG. 23 is a plan sectional view illustrating the turntable structure as taken along Section 23—23 of FIG. 24, the mold parts being shown in phantom lines, and the apparatus is in the mold part alignment relationship.
Figure 24:
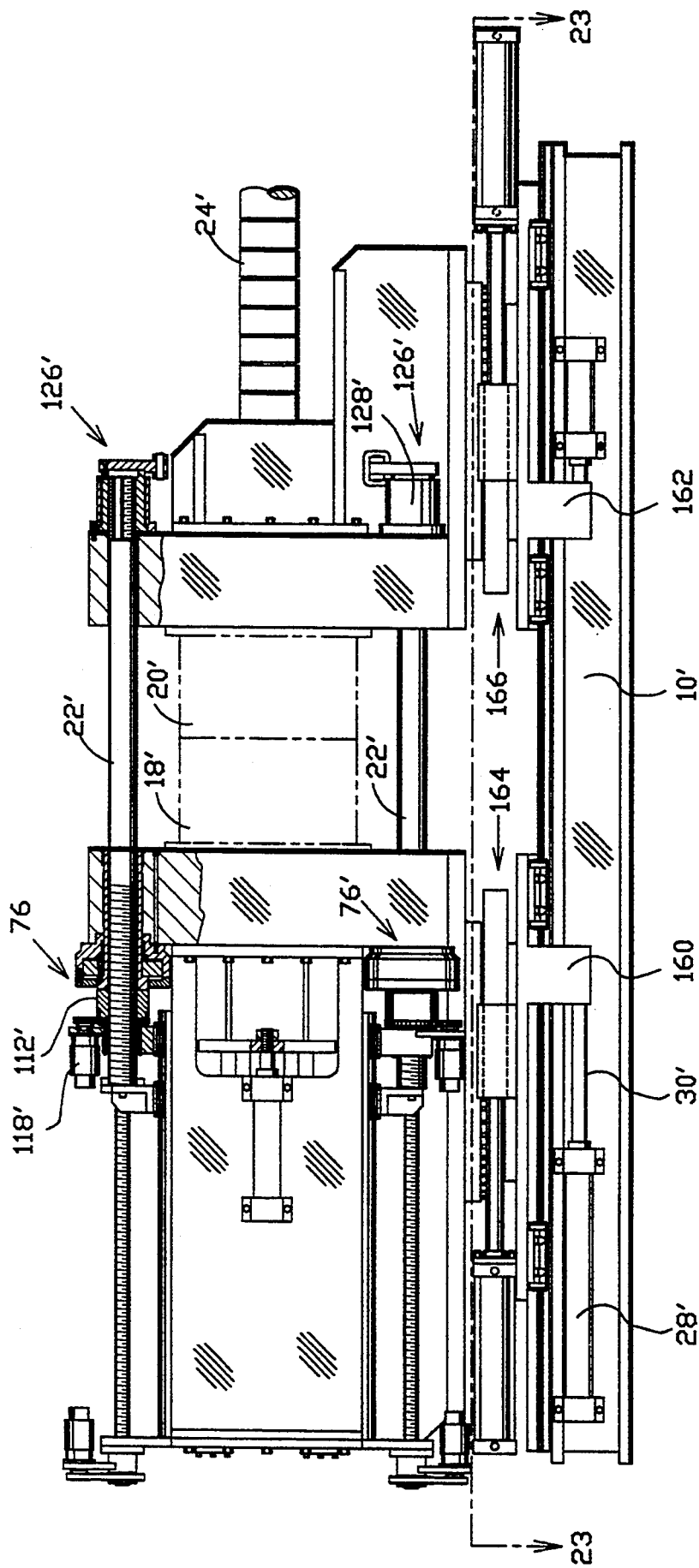
FIG. 24 is a side elevational view of the injector molding apparatus embodiment of FIG. 20 illustrating the platens and mold parts in the closed position during molding, the tie rods being extended and locked to the platens.
Figure 25:
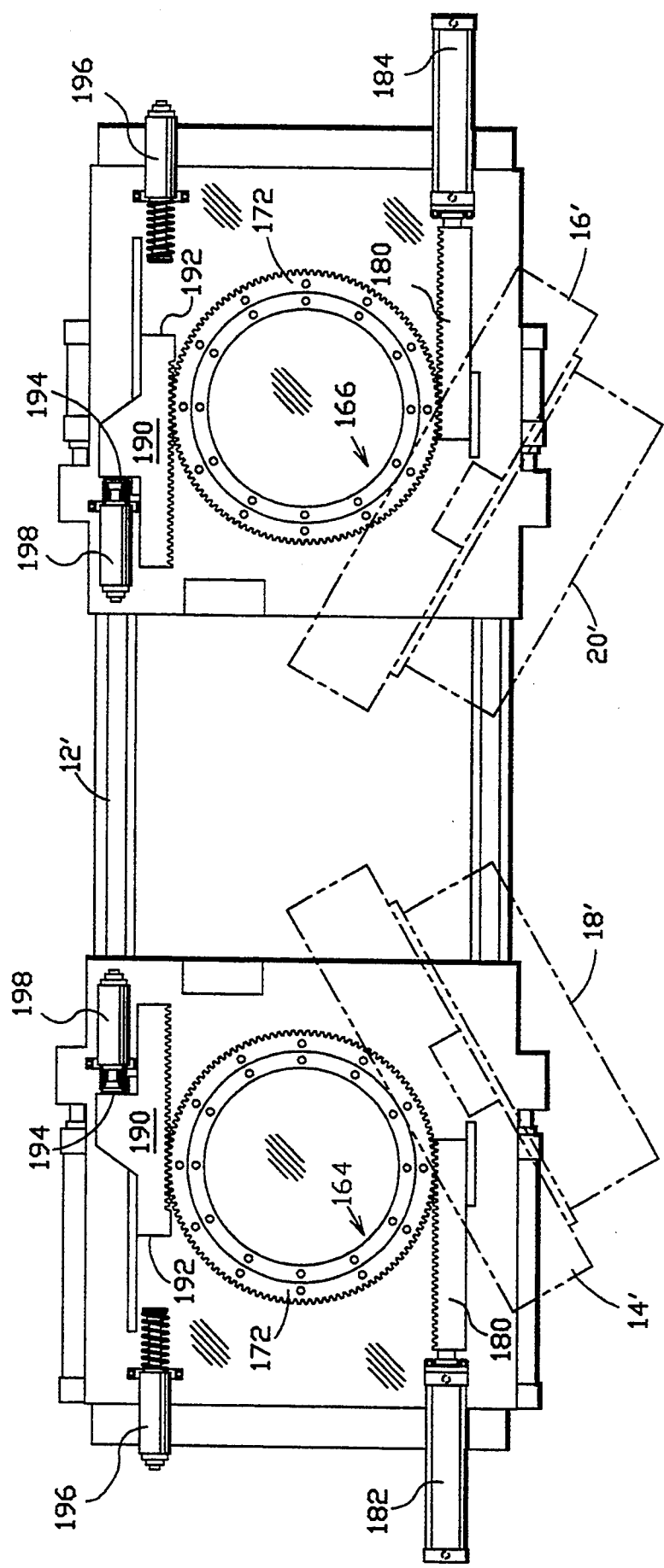
FIG. 25 is a plan sectional view similar to FIG. 23 schematically illustrating the mold parts in phantom lines wherein the turntables have been rotated approximately 45° as compared to the mold part aligned relationship of FIG. 23.

With reference to FIGS. 23 and 25, it will be appreciated that a longitudinally displaceable toothed rack 180, one of which is mounted upon each carriage 160 and 162, meshes with the teeth of the outer races 172. A hydraulic cylinder 182, and a hydraulic cylinder 184, each having a piston 186 and 188, respectively, are connected to the racks 180 whereby extension or retraction of the pistons 186 and 188 will rotate the turntables 164 and 166, and the associated platens 14' and 16'.

Racks 190 are also mounted upon the frame 10' associated and meshing with the teeth of the turntables' outer races 172, and the racks 190 each include an end 192 and a shoulder 194. The rack ends 192 are in alignment with a hydraulic shock absorbing cylinder 196 having a spring biased piston engageable with the end 192, while the cylinder shock absorbers 198 each include a spring biased piston in alignment with the shoulders 194.

As the platens 14' and 16' are moving toward and away from each other under the influence of the cylinders 28', the cylinders 182 and 184 will extend their respective piston rods to form the relationship shown in FIG. 23. At this rotation of the turntables 164 and 166, the mold parts 18' and 20' are aligned, and the engagement of the ends 192 of the racks 190 with the shock absorbing cylinders 196 will help to maintain the alignment of the mold parts, and other indexing and index locking structure may be used, if desired, not shown.

After the platens 14' and 16' have been opened at the completion of the molding operation, or even during the retracting movement of the platens as controlled by cylinders 28, the double acting cylinders 182 and 184 may be energized to retract their respective pistons 186 and 188 to rotate the turntables 164 and 166, and rotate the platens 14' and 16', and associated structure. Platen 14' will have rotated approximately 45° in a clockwise direction, while platen 16' will have rotated approximately 45° in a counterclockwise direction, FIG. 25.

When the platens 14' and 16' are fully opened, and the turntables 164 and 166 have rotated the platens and mold parts to the position shown in FIG. 25, the ejector cylinder 52' may be activated to cause the ejector pins to push the formed product from the mold part 18'. As will be appreciated from FIG. 25, the rotation of the mold part 18' makes the cavity of the mold part readily accessible from a position adjacent the side of the frame 10', and the molded product may be very easily removed from the mold part 18' manually, or by mechanical automated equipment.

Figure 26:
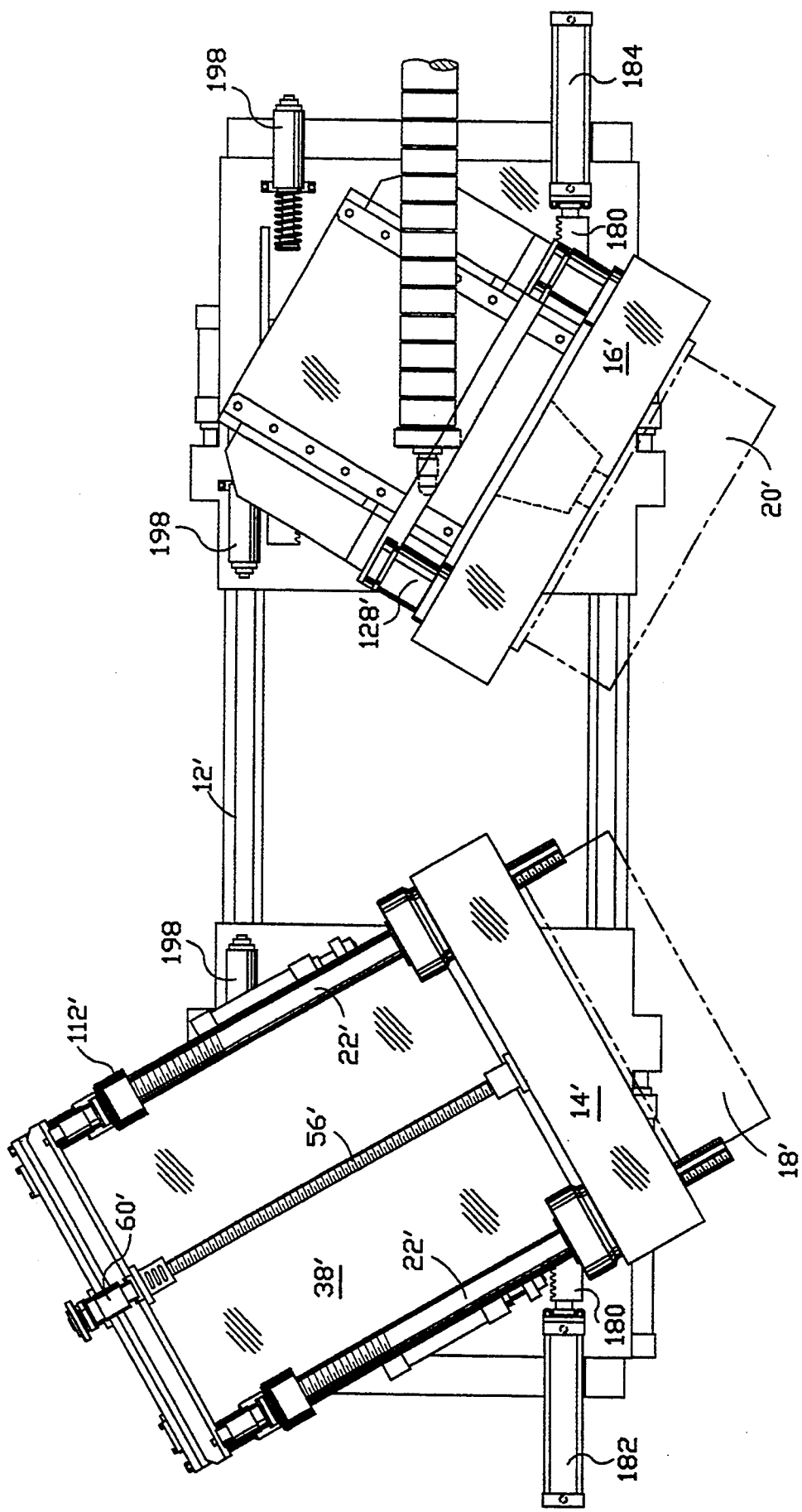
FIG. 26 is a top plan view of the embodiment of FIG. 20 illustrating the apparatus with both platens in the pivoted relationship as shown in FIG. 25.
Figure 27:
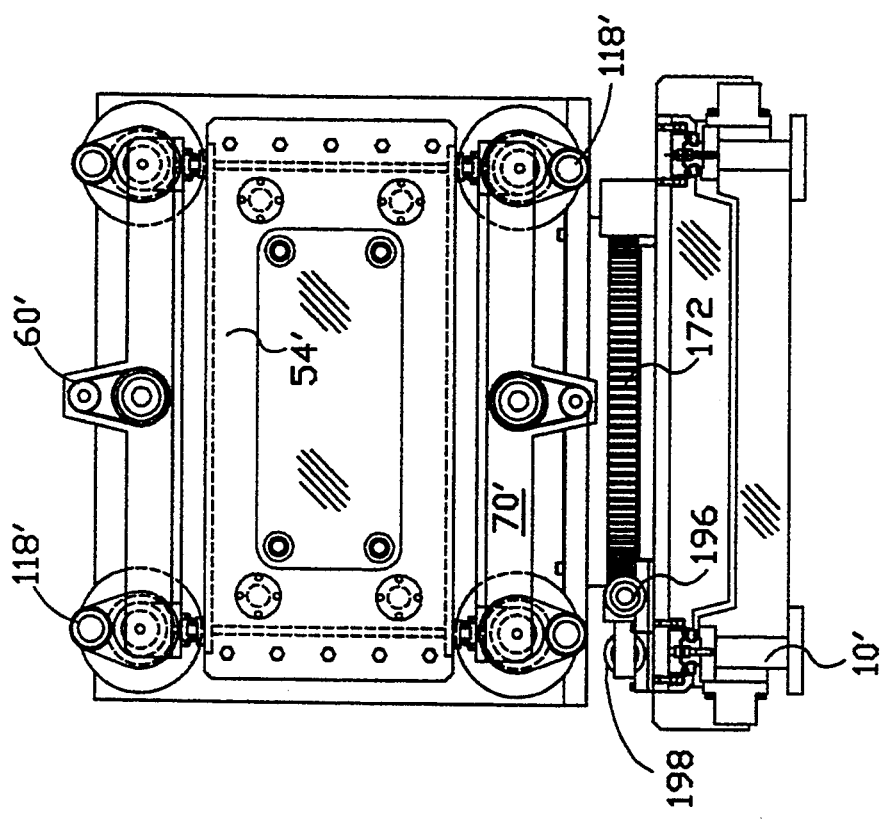
FIG. 27 is an end elevational view of the embodiment of FIG. 20 as taken from the left thereof.
Figure 28:
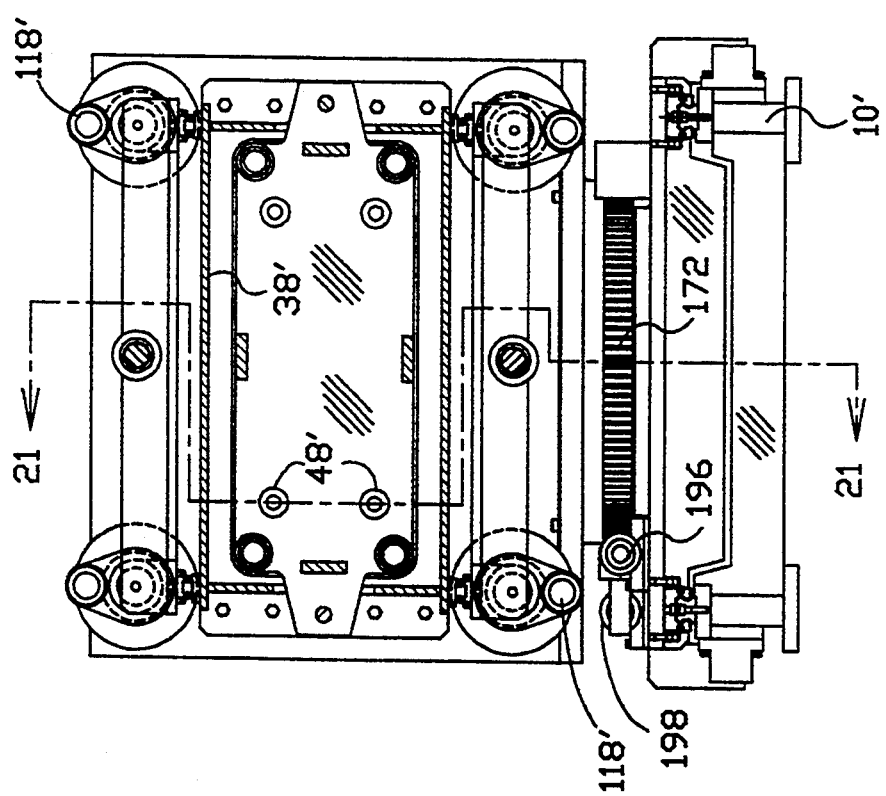
FIG. 28 is a sectional view of the embodiment of FIG. 20, the left platen structure being identical to that shown in FIG. 8, and the turntable structure being shown in elevation.
Figure 30:
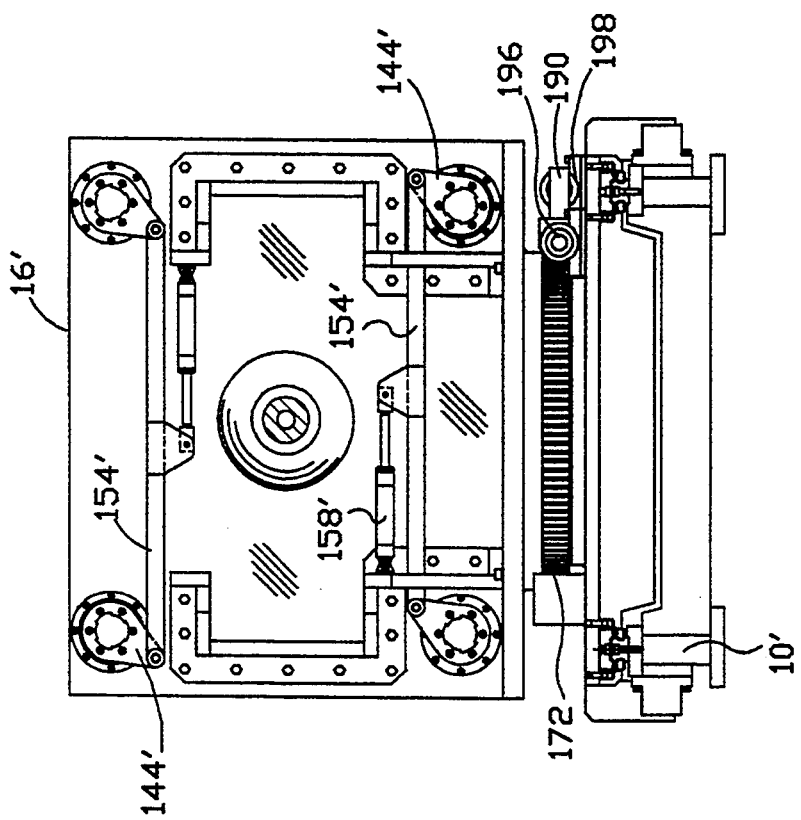
FIG. 30 is an end elevational view similar to FIG. 29, the locking yokes being shown in the tie rod locked position.
Figure 29:
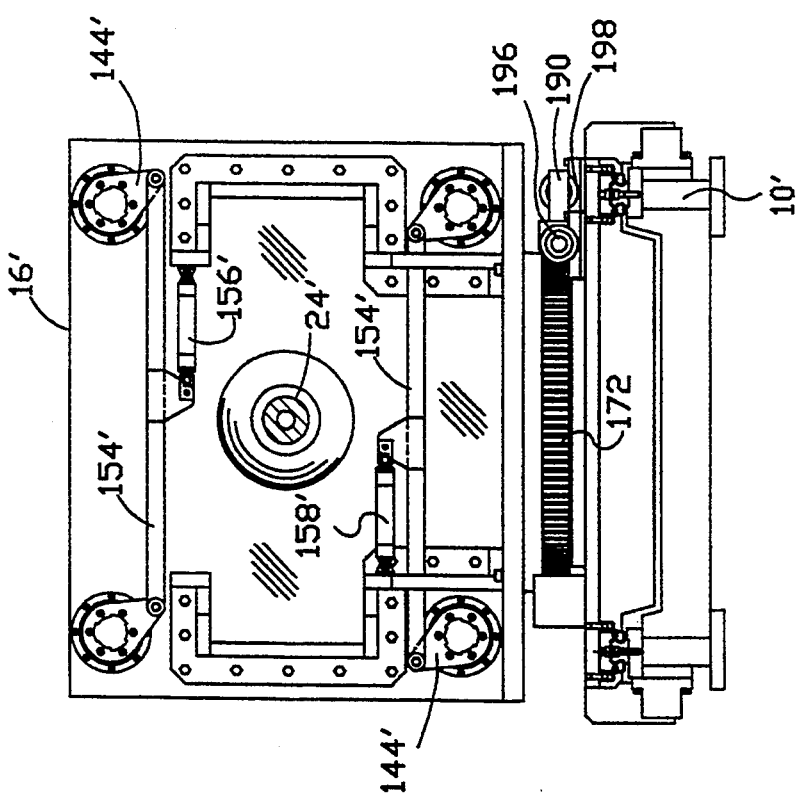
FIG. 29 is an end elevational view of the embodiment of FIG. 20 as taken from the right end thereof, the locking yokes being shown in the unlocked position.

The ability of the injection molding apparatus of the embodiment of FIGS. 20–30 to rotate about a vertical pivot axis as shown in FIGS. 25 and 26 renders the apparatus safe to work upon, and by making the cavities within mold parts 18' and 20' readily accessible, mold maintenance procedures are simplified. Additionally, the mold parts may be readily attached to, or removed from, their respective platens when so positioned.

It is to be appreciated that when rotating turntable 166 that the injector barrel 24' needs to be disconnected from the mold part 20', and a shifting of the carriage 162 to the left, FIG. 20, by cylinder 34' will disconnect the injection barrel 24' from the mold part 20' to permit the disclosed platen movement.

It is appreciated that various modifications to the inventive concepts may be apparent to those skilled in the art without departing from the spirit and scope of the invention.

I claim:

1. The method of molding articles during a molding cycle wherein first and second mold parts are mounted upon first and second platens, respectively, at least the first of the platens being movable with respect to the other along an axis, and tie rods extending between the platens and fixed to the platens to maintain the mold parts engaging during molding, the tie rods initially being removed from proximity to the mold parts at the beginning of each molding cycle, the movable first platen moving toward the second platen during the closing movement of the platens prior to molding and retracting away from the second platen during the opening movement of the platens after molding has occurred, comprising the steps of:
    (a) moving the first platen toward the second platen in a closing movement to engage the mold parts,
    (b) axially translating all of the tie rods relative to both platens during or after the closing movement of the first platen to a tie rod lockable position prior to molding wherein the tie rods are interposed between both platens and the mold parts are engaging,
    (c) locking the tie rods to both platens,
    (d) producing a molding operation within the engaging mold parts,
    (e) unlocking all of the tie rods relative to both platens,
    (f) retracting the first platen from the second platen at the termination of said unlocking and molding operation in an opening movement, and
    (g) axially translating all of the tie rods with respect to both platens during or after said opening movement of the first platen whereby all of the tie rods are removed from proximity to the mold parts during each molding cycle upon completion of the first platen opening movement providing unobstructed lateral access to the mold parts.

2. The method of molding as in claim 1 comprising the steps of:
    (a) hydraulically tensioning the tie rods subsequent to locking the tie rods to both platens, and
    (b) releasing the hydraulic tension within the tie rods upon completion of the molding operation.

3. The method of molding as in claim 1 wherein at least one of the platens is mounted for rotation about a pivot axis substantially perpendicular to the axis of relative platen movement for selective pivotal movement between a mold part alignment position and a mold part access position including the step of:
    (a) pivoting the one platen about its axis to the mold access position upon retracting the first platen from the second platen upon the completion of the molding operation to facilitate removal of the molded product from the mold part mounted upon the one platen.

* * * * *